US012644705B2

(12) United States Patent
    Li

(10) Patent No.: US 12,644,705 B2
(45) Date of Patent: Jun. 2, 2026

(54) CHIP-SCALE INERTIAL SENSOR AND INERTIAL MEASUREMENT UNIT

(71) Applicant: Zero Point Motion Ltd., Bristol (GB)

(72) Inventor: Ying Lia Li, Bristol (GB)

(73) Assignee: Zero Point Motion Ltd., Bristol (GB)

( * ) Notice: Subject to any disclaimer, the term of this patent is extended or adjusted under 35 U.S.C. 154(b) by 330 days.

(21) Appl. No.: 18/577,971

(22) PCT Filed: Jun. 29, 2022

(86) PCT No.: PCT/GB2022/051671
§ 371 (c)(1),
(2) Date: Jan. 9, 2024

(87) PCT Pub. No.: WO2023/281242
PCT Pub. Date: Jan. 12, 2023

(65) Prior Publication Data
US 2024/0263945 A1     Aug. 8, 2024

(30) Foreign Application Priority Data
Jul. 9, 2021    (GB) ................................. 202109942

(51) Int. Cl.
| | |
|---|---|
| *G01C 19/56* | (2012.01) |
| *G01C 19/5684* | (2012.01) |
| *G01C 19/64* | (2006.01) |
| *G01C 25/00* | (2006.01) |
| *G01P 15/14* | (2013.01) |
| *G01C 19/5719* | (2012.01) |

(52) U.S. Cl.
CPC ......... *G01C 19/64* (2013.01); *G01C 19/5684* (2013.01); *G01C 25/005* (2013.01); *G01P 15/14* (2013.01); *G01C 19/5719* (2013.01)

(58) Field of Classification Search
None
See application file for complete search history.

(56) References Cited

U.S. PATENT DOCUMENTS

| | | | |
|---|---|---|---|
| 11,268,812 B1 * | 3/2022 | Zell ..................... | G01C 19/5776 |
| 2014/0260614 A1 * | 9/2014 | Bhave ............... | G01C 19/5726 |
| | | | 73/514.26 |
| 2021/0123738 A1 * | 4/2021 | Touchberry .......... | G01C 25/005 |
| 2021/0223045 A1 * | 7/2021 | Bean ..................... | G01S 19/393 |

* cited by examiner

*Primary Examiner* — Herbert K Roberts
(74) *Attorney, Agent, or Firm* — FP; Sikander M. Khan

(57) ABSTRACT
Inertial Sensors and Inertial Measurement Units are provided. In one example, the chip-scale inertial sensor (CSIS) is for detecting a rate of rotation of the CSIS about an axis. The CSIS comprises an optical vibratory gyroscope (OVG) for detecting a first rate of rotation of the CSIS about the axis. The OVG is configured to output a main signal corresponding to the first rate of rotation. The CSIS further comprises an optical Sagnac gyroscope (OSG) for concurrently detecting a second rate of rotation of the CSIS about the axis. The OSG is configured to output a supplementary signal corresponding to the second rate of rotation. The CSIS further comprises a microcontroller configured to receive one or more inputs based on the main signal and supplementary signal, and to determine, based on the one or more inputs, a corrected first rate of rotation of the CSIS about the axis.

25 Claims, 13 Drawing Sheets

A

PLANAR SPIRAL
GYROSCOPE

~400

B

MICRORESONATOR
(TOROID)
GYROSCOPE

~402

C

COILED
FIBER
GYROSCOPE

CHIP-SCALE INERTIAL SENSOR AND INERTIAL MEASUREMENT UNIT

CROSS-REFERENCE TO RELATED APPLICATIONS

This application is a § 371 national stage of PCT International Application No. PCT/GB2022/051671, filed Jun. 29, 2022, claiming priority of UK patent application No. 202109942, filed Jul. 9, 2021, the entire contents of each of which are hereby incorporated by reference into the subject application.

TECHNICAL FIELD

The present disclosure relates generally to chip-scale inertial sensors and inertial measurement units.

BACKGROUND

The detection of rate of rotation is increasingly being utilised to enhance the function of devices, for example, by accurately tracking device orientation. Vibratory gyroscopes that detect rate of rotation are used in many high volume applications such as positioning, navigation and rotation monitoring.

Vibratory gyroscopes are highly sensitive to rate of rotation and so provide precise measurements. However, the long term stability performance of these gyroscopes is limited by sensitivity to vibrations and linear acceleration including gravity, also known as the g-sensitivity. This increases the noise contributions at the output of the gyroscope and reduces the accuracy of the output. Vibratory gyroscopes can also suffer from a low sensing range.

It is an object of embodiments of the invention to at least mitigate one or more problems known in the art.

SUMMARY

According to an aspect of the invention a chip-scale inertial sensor is provided. The chip-scale inertial sensor is for detecting a rate of rotation of the inertial sensor about an axis. The inertial sensor comprises an optical vibratory gyroscope for detecting a first rate of rotation of the inertial sensor about the axis. The optical vibratory gyroscope is configured to output a main signal corresponding to the first rate of rotation. The inertial sensor further comprises an optical Sagnac gyroscope for concurrently detecting a second rate of rotation of the inertial sensor about the axis. The optical Sagnac gyroscope is configured to output a supplementary signal corresponding to the second rate of rotation. The inertial sensor further comprises a microcontroller configured to receive one or more inputs based on the main signal and supplementary signal. The microcontroller is further configured to determine, based on the one or more inputs, a corrected first rate of rotation of the inertial sensor about the axis.

Whilst vibratory gyroscopes are highly sensitive, being mechanical gyroscopes, they are susceptible to unwanted motion such as vibrations, acceleration, g-sensitivity and cross axis effects. Any acceleration offsets the vibratory gyroscope which skews the rate of rotation measurement. Moreover, the sensitivity to vibrations and linear acceleration result in large bias drifts that increase the detected rotation error with time, resulting in inaccurate readout.

Conversely, current chip-scale optical Sagnac gyroscopes have a low sensitivity due to their reduced size and being limited by the sidewall roughness of the etching which reduces the optical linewidth of resonances. However, optical Sagnac gyroscopes are not susceptible to mechanical errors as they are stationary. This means the optical Sagnac gyroscope is not sensitive to linear acceleration and does not suffer from long term drift due to mechanical effects.

By providing an inertial sensor comprising both an optical vibratory gyroscope and an optical Sagnac gyroscope, the sensitive output of the optical vibratory gyroscope can be maintained and the errors in the output of the optical vibratory gyroscope can be reduced using the stable output of the optical Sagnac gyroscope. The stability of the optical Sagnac gyroscope can therefore be combined with the sensitivity of the optical vibratory gyroscope to provide a sensitive hybrid gyroscope readout that remains accurate for longer durations.

In particular, the output of the optical Sagnac gyroscope can be used to correct the output of the optical vibratory gyroscope in order to reduce errors at the output of the optical vibratory gyroscope. Such correction reduces the effects of g-sensitivity and vibrations that are present in the output of the optical vibratory gyroscope and improves the long term stability performance of the optical vibratory gyroscope. Thus, the combination of the optical vibratory gyroscope and optical Sagnac gyroscope enables the provision of a rate of rotation measurement at the output of the inertial sensor that is both sensitive and accurate and robust to errors due to effects within the optical vibratory gyroscope such as vibration, shock, cross axis effects and linear acceleration.

Another advantage of combining an optical vibratory gyroscope and optical Sagnac gyroscope is that the optical vibratory gyroscope may have a low sensing range of approximately 300 deg/s for closed loop systems and 100 deg/s for open loop systems whereas an optical Sagnac gyroscope may have a significantly larger sensing range of more than 1000 deg/s. The optical Sagnac gyroscope sensing bandwidth is limited by the round trip time of the photons propagating in the optical cavity. This is very fast, and so the limit becomes set by the acquisition rate, which can be greater than kilohertz, or by the optimum averaging time (to reduce noise), which can set the bandwidth closer to 100 Hz. Thus, if the rate of rotation of the inertial sensor exceeds that detected by the optical vibratory gyroscope, the output of the optical Sagnac gyroscope can be used to detect rate of rotation instead. This extends the sensing range of the inertial sensor.

The use of an optical vibratory gyroscope rather than a purely electro-mechanical vibratory gyroscope enables a significant reduction in noise and, consequently, an increase in sensitivity of the sensor. Moreover, by implementing two optical gyroscopes, both gyroscopes can share optical components. Both gyroscopes can also harness the signal-to-noise amplifying power of optical resonances.

Whilst purely electro-mechanical vibratory gyroscopes may provide a larger sensing range than optical vibratory gyroscopes, for the reasons mentioned above, the combination of the optical vibratory gyroscope and the optical Sagnac gyroscope extends the sensing range of the inertial sensor beyond the sensing range achievable with an electro-mechanical vibratory gyroscope, countering any advantage provided by purely electro-mechanical vibratory gyroscopes.

Thus, the combination of features of the invention provide a sensitive, accurate and compact inertial sensor with a large sensing range.

The optical vibratory gyroscope and the optical Sagnac gyroscope both detect rate of rotation of the inertial sensor about the same axis. Thus, the gyroscopes are to detect the same rate of rotation of the inertial sensor, and so any difference in the detected rate of rotation is due to limitations in one or both of the gyroscopes.

The microcontroller may receive the main signal and supplementary signal. The microcontroller may output, from the inertial sensor, an output signal corresponding to the corrected first rate of rotation. The corrected first rate of rotation may be the first rate of rotation that has been corrected, for example, to remove or at least reduce errors. Thus, the output signal may be the main signal that has been corrected.

The optical vibratory gyroscope and the optical Sagnac gyroscope may receive light from the same light source.

By implementing two optical gyroscopes, both gyroscopes can share a light source, which reduces the number of components needed, and consequent space and energy consumed, in a chip comprising the inertial sensor. Moreover, sharing the same light source enables light with the same properties to be utilised in both gyroscopes.

The light source may be a laser. The light received by the optical vibratory gyroscope and/or the optical Sagnac gyroscope may be broadband light. Alternatively, the light received by the optical vibratory gyroscope and/or the optical Sagnac gyroscope may be coherent single frequency light.

The chip-scale inertial sensor may further comprise a beamsplitter or directional coupler to split the light from the light source for transmission into the optical vibratory gyroscope and the optical Sagnac gyroscope.

The chip-scale inertial sensor may further comprise a light source for transmitting light into the optical vibratory gyroscope and the optical Sagnac gyroscope.

The inertial sensor comprising a light source eliminates any coupling losses associated with connecting an external light source to the inertial sensor through fiber. Moreover, having a light source integrated within the sensor provides energy efficiency and energy proportionality.

The chip-scale inertial sensor may further comprise at least one detector to detect light transmitted from the optical vibratory gyroscope and the optical Sagnac gyroscope, the microcontroller to receive the one or more inputs from the at least one detector.

The inertial sensor may comprise a detector to detect light transmitted from the optical vibratory gyroscope and a detector to detect light transmitted from the optical Sagnac gyroscope. The main signal may be the light transmitted from the optical vibratory gyroscope to the detector. The supplementary signal may be the light transmitted from the optical Sagnac gyroscope to the detector.

Determining, based on the one or more inputs, a corrected first rate of rotation may comprise comparing the first rate of rotation to the second rate of rotation and determining the corrected first rate of rotation based on the comparison.

Comparing the first rate of rotation to the second rate of rotation enables the detection of any errors in the detected rotations. The corrected first rate of rotation can then be determined to reduce such errors. In particular, by correcting the first rate of rotation rather than finding an average of the rotations, the sensitivity of the optical vibratory gyroscope is maintained whilst reducing any errors in its output detected by the comparison.

Comparing the first rate of rotation to the second rate of rotation may comprise calculating the difference between the main signal and supplementary signal to determine the short and long term errors of the optical vibratory gyroscope. Determining the corrected first rate of rotation based on the comparison comprises correcting the main signal to remove the short and long term errors.

As the optical Sagnac gyroscope is less sensitive to the causes of short and long term errors such as linear acceleration, comparing the main signal output by the optical vibratory gyroscope and the supplementary signal output by the optical Sagnac gyroscope exposes the short and long term errors of the optical vibratory gyroscope. These errors can then be removed from the main signal. Such calibration using the optical Sagnac gyroscope therefore improves the short term and long term stability performance of the optical vibratory gyroscope, whilst maintaining its sensitivity.

The errors may be due to linear acceleration and/or long term drift of the inertial sensor.

The errors may be due to vibration and/or other sources of mechanically induced drift.

The errors may due to factors that affect the optical vibratory gyroscope but do not affect the optical Sagnac gyroscope, such that it is possible to identify such errors by comparing the outputs of the gyroscopes, thus enabling the removal of such errors and improving the accuracy of the output of the inertial sensor.

Comparing the first rate of rotation to the second rate of rotation may comprise determining if the main signal is saturated. If the main signal is saturated, the corrected first rate of rotation may be determined using the supplementary signal only.

The optical vibratory gyroscope may have a low sensing range of 300 deg/s. Thus, the main signal output from the optical vibratory gyroscope may be saturated due to the rate of rotation being above the sensing range of the optical vibratory gyroscope. However, as the optical Sagnac gyroscope may have a significantly larger sensing range of more than 1000 deg/s, the supplementary signal is less likely to be saturated and is more likely to be able to accurately detect a large rate of rotation. Thus, where the main signal is saturated, the supplementary signal output by the optical Sagnac gyroscope can be used to provide the corrected rate of rotation. In such a case, the main signal is not used due to its saturation.

Therefore, when the rate of rotation of the inertial sensor is within the sensing range of the optical vibratory gyroscope, the corrected rate of rotation may be a corrected version of the first rate of rotation detected by the optical vibratory gyroscope, which is highly sensitive. When the rate of rotation of the inertial sensor is above the sensing range of the optical vibratory gyroscope, it can still be detected by the inertial sensor because the corrected rate of rotation may be based on the second rate of rotation detected by the optical Sagnac gyroscope. By enabling the corrected rate of rotation to be based on the supplementary signal output by the optical Sagnac gyroscope when the main signal is saturated, the sensing range of the sensor is increased. This provides an inertial sensor with a higher sensing range. Moreover, this removes the common trade-off between sensitivity and sensing range, providing a sensitive inertial sensor with a high sensing range.

The optical vibratory gyroscope and optical Sagnac gyroscope may be fabricated on the same chip. This provides a compact inertial sensor. Moreover, this reduces the likelihood of error during calibration because there is less likelihood of relative movement between the gyroscopes and so the gyroscopes are more likely to be rotated by the same amount. This enables the error in the output of the optical vibratory gyroscopes due to long term and short term effects to be accurately determined and removed.

The microcontroller may be further configured to output a feedback signal to actuate a test mass of the optical vibratory gyroscope to recalibrate the optical vibratory gyroscope based on the comparison.

For example, where the same error is present in each output of the optical vibratory gyroscope, it may be determined that this is due to the test mass of the optical vibratory gyroscope being in a different place than during initial calibration. Recalibration would therefore actuate the test mass to move the test mass back to its position during initial calibration to reduce the error present in the output of the optical vibratory gyroscope. The required recalibration can be determined from the error in the output of the optical vibratory gyroscope. Thus, recalibration reduces the errors in the output of the optical vibratory gyroscope and so reduces the correction of the output required by the microcontroller, increasing the speed of the inertial sensor and decreasing the likelihood of errors at the output of the inertial sensor.

The feedback signal may be output to electrodes of the optical vibratory gyroscope to electrostatically actuate the test mass.

The optical Sagnac gyroscope may comprise a coiled or spiraled waveguide structure to propagate light clockwise and counter clockwise, the rotation of the sensor causing changes in the optical path lengths of the light propagating clockwise and counter clockwise.

The coiled or spiraled waveguide structure provides a compact optical Sagnac gyroscope that can therefore be integrated in the same chip as the optical vibratory gyroscope.

The rate of rotation of the inertial sensor may be detected by the optical Sagnac gyroscope based on the changes in the optical path lengths of the light propagating clockwise and counter clockwise.

The rate of rotation of the inertial sensor may be detected from the changes in the optical path lengths of the light propagating clockwise and counter clockwise by detecting changes in the interference of the light propagating clockwise and counter clockwise or by detecting the difference between the resonance frequencies of the light propagating clockwise and counter clockwise caused by a different shift in resonance frequencies of the light propagating clockwise and counter clockwise. For example, due to rotation of the inertial sensor, the resonance frequency of the light propagating clockwise will shift in a first direction and the resonance frequency of the light propagating counter clockwise will shift in a second direction opposite to the first direction, resulting in a difference in the resonance frequencies of the light propagating clockwise and counter clockwise.

The coiled or spiraled waveguide structure may be in the form of one of a coiled optical fiber, a coiled waveguide, a spiraled waveguide and a microdisk.

The diameter of the coiled or spiraled waveguide structure may be in the order of millimetres or centimetres. For example, the diameter of the coiled or spiraled waveguide may be approximately 2 cm. The small diameter provides a compact optical Sagnac gyroscope that can therefore be integrated in the same chip as the optical vibratory gyroscope.

The microcontroller may control the frequency of the light propagating clockwise and counter clockwise based on the supplementary signal output by the optical Sagnac gyroscope to reduce frequency changes of the light due to drifting. Thus, feedback may be used to maintain a correct output of the optical Sagnac gyroscope. By maintaining the correct output of the optical Sagnac gyroscope, when it is compared to the output from the optical vibratory gyroscope, it is more likely the errors are in the output from the optical vibratory gyroscope. This ensures more accurate correction of errors and increases the accuracy of the corrected first rate of rotation of the inertial sensor.

The optical Sagnac gyroscope may further comprise a phase shifter to shift light to propagate either clockwise or counter clockwise by 90 degrees before propagation into the coiled or spiraled waveguide structure such that there is a 90 degree phase shift between the light propagating clockwise and counter clockwise.

The optical Sagnac gyroscope and optical vibratory gyroscope may be made of silicon or silicon nitride. This simplifies the fabrication process, particularly when the gyroscopes are to be fabricated on the same chip. Thus, this facilitates integration of the gyroscopes on the same chip.

The optical vibratory gyroscope may comprise one or more microresonators, each microresonator supporting a corresponding optical resonance. The optical vibratory gyroscope may further comprise a micro-electro-mechanical inertial test mass suspended adjacent to and non-contiguous with the one or more microresonators, the test mass deflectable under the application of an inertial force. The optical vibratory gyroscope may further comprise one or more optical couplers for coupling light transmitted into the optical vibratory gyroscope into and out of a corresponding microresonator. The optical vibratory gyroscope may further comprise one or more detectors for detecting light received from the one or more microresonators by the one or more optical couplers. A change in a spacing between the test mass and at least one microresonator may cause a change in the optical resonance characteristics of that microresonator.

Using optics to sense rate of rotation provides a highly sensitive measurement. Using resonant light for the optomechanical readout mechanism provides even more sensitivity as the motion of the test mass shifts the resonance condition, amplifying the signal and not the noise.

The optical vibratory gyroscope may further comprise one or more electrodes for counteracting a deflection of the test mass with an electrostatic force. The microcontroller may be further configured to control the electrostatic force of the one or more electrodes to cause the test mass to vibrate at a fixed frequency in a first direction such that the optical vibratory gyroscope can detect the first rate of rotation of the inertial sensor about the axis. The microcontroller may be further configured to receive an electrical signal from the one or more detectors. The microcontroller may be further configured to detect a change in the optical resonance characteristics of the one or more microresonators in response to a change in the spacing between the test mass and the one or more microresonators in a second direction perpendicular to the first direction at the fixed frequency. The microcontroller may be further configured to determine the first rate of rotation of the inertial sensor about the axis based on the change in optical resonance characteristics of the one or more microresonators.

This construction of the optical vibratory gyroscope provides the following advantages. The combination of a cavity enhanced optomechanical readout mechanism and electrostatic actuation of the test mass provides significant advantages over purely electromechanical gyroscopes (in which both readout and actuation are performed using electrodes) and purely optical gyroscopes (in which both readout and actuation are controlled by optical means). In particular, utilising voltage only for the actuation of the test mass and not for the sensing enables a significant reduction in noise and, consequently, an increase in sensitivity of the gyroscope. The use of voltage for the actuation also enables large test masses to be used without high optical power being required, as they can be actuated effectively and efficiently using voltage, which is not possible when using optical means for actuation. Moreover, using resonant light for the optomechanical readout mechanism provides even more sensitivity as the motion of the test mass shifts the resonance condition, amplifying the signal and not the noise.

The combination of optomechanical sensing of the displacement of the test mass (using one or more microresonators and one or more optical couplers) in combination with electrostatic actuation of the test mass (using one or more electrodes) in the optical vibratory gyroscope provides a hybrid optical-electro-mechanical gyroscope with improved sensitivity, and an improved signal to noise ratio, when compared to a gyroscope based on capacitive sensing, without compromising on the size of the test mass. Such a gyroscope retains the ability to actuate a large test mass for a large mechanical response to inertial forces.

The hybrid nature of the optical vibratory gyroscope provides for both improved sensitivity and improved response, something that would not be possible with an all optical gyroscope. Such an improved response is important in order to effectively tune or calibrate the gyroscope sensitivity. In fact, by providing sufficient actuation of the test mass, closed loop operation can be implemented effectively such that the drift, for example thermally induced drift, or non-linear responses of the test mass can be better controlled. Accordingly, the gyroscope is less likely to encounter a positioning error. Moreover, when positioning errors do occur, the inertial sensor described herein can correct such errors using the output of the optical Sagnac gyroscope. Thus, an inertial sensor comprising such an optical vibratory gyroscope reduces the likelihood of errors, and corrects errors when they do occur, providing a highly accurate sensor.

The combination of the optical readout mechanism and the closed loop operation of the optical vibratory gyroscope with the optical Sagnac gyroscope allows for the best balance of sensitivity, control and long-term stability to provide a sensitive and stable inertial sensor that can be precisely controlled to achieve the necessary measurements.

The microcontroller may be further configured to control the electrostatic force of the one or more electrodes to recalibrate the optical vibratory gyroscope based on the comparison. Thus, where the test mass has drifted over time, this can be detected at the output of the optical vibratory gyroscope using the output of the optical Sagnac gyroscope and corrected using the electrodes of the optical vibratory gyroscope such that the output of the optical vibratory gyroscope no longer outputs such an error, or outputs a smaller error. Thus, long term and short term errors of the optical vibratory gyroscope can be corrected not just at the output but within the optical vibratory gyroscope using the output of the optical Sagnac gyroscope. Reducing the errors of the optical vibratory gyroscope through active regulation of its mechanical response will reduce the likelihood of errors needing to be computationally corrected, as well as minimising growth of unregulated mechanical responses. This improves the accuracy of the output of the inertial sensor and increases the sensing speed.

According to another aspect of the invention an inertial measurement unit is provided. The inertial measurement unit comprises a plurality of chip-scale inertial sensors for detecting a rate of rotation about a respective axis. Each inertial sensor comprises an optical vibratory gyroscope for detecting a first rate of rotation of the inertial sensor about the axis. The optical vibratory gyroscope is configured to output a main signal corresponding to the first rate of rotation. Each inertial sensor further comprises an optical Sagnac gyroscope for concurrently detecting a second rate of rotation of the inertial sensor about the axis. The optical Sagnac gyroscope is configured to output a supplementary signal corresponding to the second rate of rotation. The inertial measurement unit further comprises a controller configured to, for each inertial sensor, receive one or more inputs based on the main signal and supplementary signal of the inertial sensor. The controller is further configured to, for each inertial sensor, determine, based on the one or more inputs, a corrected first rate of rotation of the inertial sensor about the respective axis.

By providing a controller separately from the inertial sensor, the controller can be shared across all inertial sensors, reducing the circuitry needed for each inertial sensor and the circuitry of the inertial measurement unit, resulting in a reduction in power and space of the inertial measurement unit.

The inertial measurement unit may comprise a first chip-scale inertial sensor for detecting rate of rotation of the first inertial sensor in a first axis, a second chip-scale inertial sensor for detecting rate of rotation of the second inertial sensor in a second axis perpendicular to the first axis and a third chip-scale inertial sensor for detecting rate of rotation of the third inertial sensor in a third axis perpendicular to the first axis and second axis. The controller may be further configured to determine a total rate of rotation of the inertial measurement unit based on the corrected first rate of rotation determined for each inertial sensor.

Detecting rate of rotation in all three axes enables any rotation of the inertial measurement unit to be detected, which is beneficial for monitoring the exact position and movement of the inertial measurement unit.

According to another aspect of the invention a chip is provided. The chip comprises a chip-scale inertial sensor as described herein or an inertial measurement unit as described herein.

According to another aspect of the invention a method is provided. The method is performed by a microcontroller for determining a rate of rotation of an inertial sensor about an axis. The method comprises receiving one or more inputs based on a main signal output from an optical vibratory gyroscope for detecting a first rate of rotation of the inertial sensor about the axis and a supplementary signal output from an optical Sagnac gyroscope for concurrently detecting a second rate of rotation of the inertial sensor about the axis. The method further comprises determining, based on the one or more inputs, a corrected first rate of rotation of the inertial sensor about the axis.

According to another aspect of the invention a computer readable medium is provided. The computer readable medium has instructions stored thereon which, when executed by one or more processors, cause the one or more processors to perform the method as described herein.

The test mass of the optical vibratory gyroscope may have an average thickness of more than a micron.

The test mass of the optical vibratory gyroscope may have an average thickness in the order of tens or hundreds of microns.

The test mass of the optical vibratory gyroscope may be significantly larger than the microresonator. The test mass may have an average thickness of more than or equal to 10 microns. The test mass may have an average thickness of less than 500 microns. The test mass may have an average thickness between 20 and 30 microns. The test mass may be significantly thicker, for example 100 times thicker, than the microresonator. The test mass may have a larger surface area than the microresonator. The surface area of the test mass may be less than 1 millimetre by 1 millimetre. The surface area of the test mass may be approximately 250 microns by 250 microns. The diameter of the microresonator may be approximately 100 microns. The large size of the test mass provides an improved response to rate of rotation of the optical vibratory gyroscope.

The optical vibratory gyroscope may comprise at least two microresonators, at least two optical couplers, and at least two detectors. A change in a first spacing between the test mass and a first of the two microresonators and a change in a second spacing between the test mass and a second of the two microresonators may cause a differential change in the optical resonance characteristics of the two microresonators.

The test mass of the optical vibratory gyroscope may be suspended between a first microresonator and a second microresonator.

The test mass of the optical vibratory gyroscope may include a protrusion, the protrusion located between a first microresonator and a second microresonator. The protrusion may act as an optical channel to guide photons that have escaped from the first and/or second microresonator. This enhances the sensitivity of the gyroscope because the photons are absorbed or transmitted by the protrusion.

The test mass of the optical vibratory gyroscope may further include one or more additional protrusions, the one or more additional protrusions each located between two microresonators.

At least two of the electrodes of the optical vibratory gyroscope may each include a finger that is stationary with respect to the gyroscope and the test mass may include a finger that is movable with respect to the gyroscope, the movable finger of the test mass located between the stationary fingers of the at least two electrodes such that the fingers of the test mass and at least two electrodes are interdigitated.

The motion of the finger is strongly coupled to the motion of the test mass such that a movement of the finger results in a movement of the test mass as a whole. Thus, the stationary fingers of the electrodes are used to control the movement of the finger of the test mass and consequently control the movement of the test mass. The finger may be integral to or rigidly affixed to the test mass so as to be stationary with respect to the test mass. Alternatively, the finger of the test mass may have its own mechanical degree(s) of freedom, for example like a cantilever mode; however the finger of the test mass may be arranged such that it is only used to move or maintain the position of the entire test mass.

The one or more microresonators of the optical vibratory gyroscope may be radially separated from the test mass.

The one or more electrodes and/or the one or more microresonators of the optical vibratory gyroscope may be fixed relative to the gyroscope.

The one or more microresonators of the optical vibratory gyroscope may be whispering gallery mode resonators.

The one or more microresonators of the optical vibratory gyroscope may each have an evanescent field extending beyond the edge of that microresonator in use. The amount the evanescent field extends beyond the edge of the microresonator may be based on the size of the wavelength of the light coupled into the optical coupler. The evanescent field may extend at least 1 micron beyond the edge of that microresonator in use. This provides a particularly effective gyroscope when the wavelength of the light coupled into the optical coupler is 1550 nm.

The test mass of the optical vibratory gyroscope may be larger than each of the one or more microresonators.

The change in the optical resonance characteristics of the optical vibratory gyroscope may be a shift in the optical resonance and/or a broadening of the optical resonance.

The one or more microresonators of the optical vibratory gyroscope may each have a different optical resonance.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE DRAWINGS

Embodiments of the invention will now be described, by way of example only, with reference to the accompanying drawings, in which:

FIG. 13 shows a block diagram of an example inertial measurement unit.

Throughout the description and drawings, like reference numerals refer to like parts.

DETAILED DESCRIPTION

Figure 1:
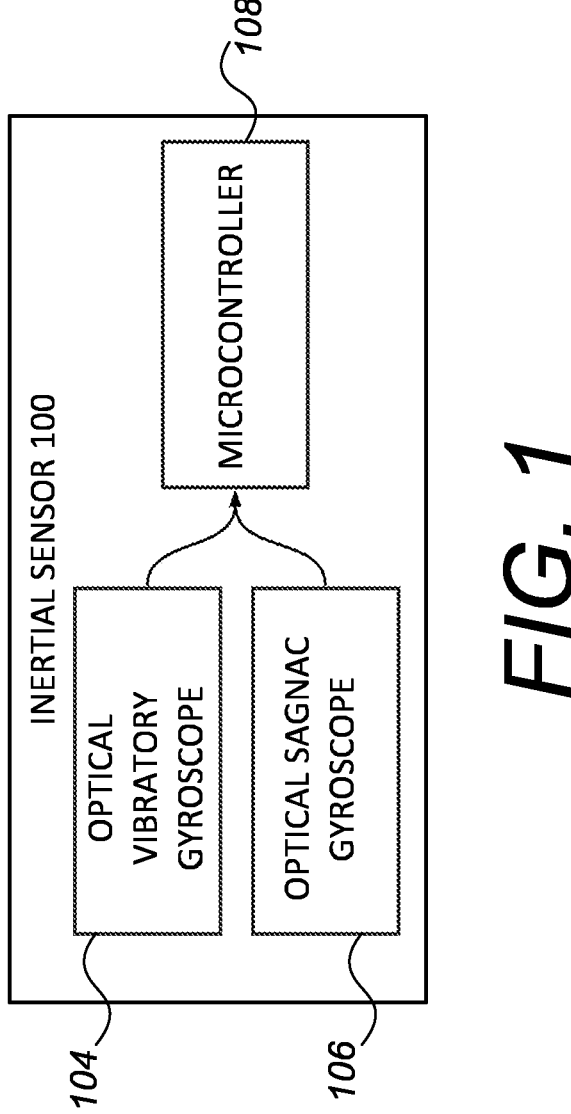
FIG. 1 shows a schematic diagram of an example inertial sensor.

Whilst various embodiments are described below, the invention is not limited to these embodiments, and variations of these embodiments may well fall within the scope of the invention which is to be limited only by the claims.

In what follows, chip-scale inertial sensors for detecting rate of rotation are described. Whilst example optical Sagnac gyroscopes and optical vibratory gyroscopes are provided, the inertial sensor described herein may be implemented with other optical Sagnac gyroscopes and optical vibratory gyroscopes, as will be appreciated by the skilled person.

As will be appreciated upon reading the detailed description, a chip-scale inertial sensor is an inertial sensor that is small enough to fit onto a chip. A chip can vary in size but its area typically ranges from 1 mm² to 600 mm². Thus, in some examples, chip-scale may be smaller than 600 mm². A chip is also known as an integrated circuit (IC). Throughout the description, inertial sensor and chip-scale inertial sensor are used interchangeably to mean a chip-scale inertial sensor.

As will be appreciated upon reading the detailed description, the structure within the optical Sagnac gyroscope that enables the rate of rotation to be detected may be any Sagnac structure. A coiled or spiraled waveguide is an example of a Sagnac structure.

As will be appreciated upon reading the detailed description, a signal being saturated means that the upper limit of detection has been reached and, optionally, exceeded. For example, for measuring rate of rotation, the main signal (as output by the optical vibratory gyroscope) being saturated means that the rate of rotation of the inertial sensor has reached or exceeded the limit of detection of the optical vibratory gyroscope. Saturation may appear in the main signal as the largest possible signal that the optical vibratory gyroscope can output. Saturation results in the main signal no longer corresponding to the actual rate of rotation of the inertial sensor because any rate of rotation at or above the limit of detection would provide the same main signal. An example limit of detection of the optical vibratory gyroscope is 300 deg/s.

As will be appreciated upon reading the detailed description, a microresonator is a closed-circuit object that supports an optical resonance. A microresonator supporting an optical resonance means the light that enters the closed circuit of the microresonator is amplified at at least one resonant frequency due to constructive interference and total internal reflection in the microresonator. Example materials for microresonators include silicon, silica, silicon nitride and crystalline fluorides. Example diameters of microresonators range from microns to hundreds of millimetres.

As will be appreciated upon reading the detailed description, a test mass refers to a mechanical structure for use in MEMS sensors. Example materials for test masses are silicon and quartz.

As will be appreciated upon reading the detailed description, an optical coupler is a means to couple light into and out of a microresonator. The optical coupler may be a waveguide. The optical coupler may be attached to a waveguide. The optical coupler may guide light from a light source into a microresonator. The optical coupler may guide light from a microresonator to a detector. The optical coupler may be a buried waveguide, a ridge waveguide or a rib waveguide. The optical coupler may be fabricated at the same time as the microresonator.

As will be appreciated upon reading the detailed description, a change in the optical resonance characteristics is any change in the characteristics of the optical resonance. The change in the optical resonance characteristics may be a change in the line shape of the optical resonance characteristics, for example a reduction of the peak amplitude. The change in the optical resonance characteristics may be a change in location of the optical resonance.

FIG. 1 shows a schematic diagram of an example inertial sensor 100. The inertial sensor 100 is for detecting a rate of rotation of the inertial sensor about an axis. The inertial sensor 100 comprises an optical vibratory gyroscope 104 for detecting a first rate of rotation of the inertial sensor 100 about the axis. The optical vibratory gyroscope 104 is configured to output a main signal corresponding to the first rate of rotation. The inertial sensor 100 further comprises an optical Sagnac gyroscope 106 for concurrently detecting a second rate of rotation of the inertial sensor 100 about the axis. The optical Sagnac gyroscope 106 is configured to output a supplementary signal corresponding to the second rate of rotation. The inertial sensor 100 further comprises a microcontroller 108 configured to receive one or more inputs based on the main signal and supplementary signal. The microcontroller 108 is further configured to determine, based on the one or more inputs, a corrected first rate of rotation of the inertial sensor about the axis. The microcontroller 108 may output the corrected first rate of rotation from the inertial sensor 100 (not shown).

The optical vibratory gyroscope 104 and optical Sagnac gyroscope 106 may be fabricated on the same chip to produce a hybrid chip. In fact, the optical vibratory gyroscope 104 and optical Sagnac gyroscope 106 may be fabricated on a common substrate. The optical vibratory gyroscope 104 and optical Sagnac gyroscope 106 are fixed within the inertial sensor 100 such that, when the inertial sensor 100 is rotated, the inertial sensor 100, optical vibratory gyroscope 104 and optical Sagnac gyroscope 106 rotate with the same rate of rotation. Thus, detection of rate of rotation of one of the gyroscopes is the same as detection of rate of rotation of the inertial sensor 100.

The optical vibratory gyroscope 104 and optical Sagnac gyroscope 106 may detect rate of rotation of the inertial sensor 100 independently, as explained in detail below. The microcontroller 108 may receive one or more inputs based on the main signal output by the optical vibratory gyroscope and supplementary signal output by the optical Sagnac gyroscope. For example, the microcontroller 108 may receive the main signal and supplementary signal. The microcontroller 108 may then compare the one or more inputs that are based on the outputs of the optical vibratory gyroscope 104 and optical Sagnac gyroscope 106 to find the true rate of rotation of the inertial sensor 100. This is because the supplementary signal output by the optical Sagnac gyroscope 106 will not contain fictitious readings from vibration and linear acceleration.

For example, when comparing the main and supplementary signals, if the microcontroller finds that the main signal output from the optical vibratory gyroscope 104 corresponds to a larger rate of rotation than the supplementary signal output from the optical Sagnac gyroscope 106, the microcontroller may determine that the difference in rate of rotation is due to an error in the optical vibratory gyroscope 104 and so may remove the error of the main signal to provide a corrected main signal at the output of the inertial sensor 100. The microcontroller 108 may calculate the error as the difference between the main signal and supplementary signal or the difference between the detected first rate of rotation and second rate of rotation. The microcontroller 108 may calculate the error based on a plurality of main signals and supplementary signals. For example, the microcontroller 108 may take an average of the differences between the detected first rate of rotation and second rate of rotation for determining the corrected first rate of rotation.

In another example, when comparing the signals, if the microcontroller finds that the main signal output from the optical vibratory gyroscope 104 corresponds to a much smaller rate of rotation than the supplementary signal output from the optical Sagnac gyroscope 106 and the first rate of rotation detected by the optical vibratory gyroscope 104 is the maximum rate of rotation detectable by the gyroscope 104, the microcontroller may decide that the optical vibratory gyroscope 104 is saturated and so may output the supplementary signal from the inertial sensor 100.

After comparing the outputs from the gyroscopes, in addition to correcting the error in the output of the optical vibratory gyroscope 104 to provide a corrected first rate of rotation, the microcontroller 108 may provide a feedback signal to the optical vibratory gyroscope 104 to reduce the drift within the optical vibratory gyroscope 104 and consequently reduce the error at the output of the optical vibratory gyroscope 104. The microcontroller 108 may also implement a feedback mechanism to reduce the drift within the optical vibratory gyroscope 104 based on information not arising from the Sagnac gyroscope.

Figure 2:
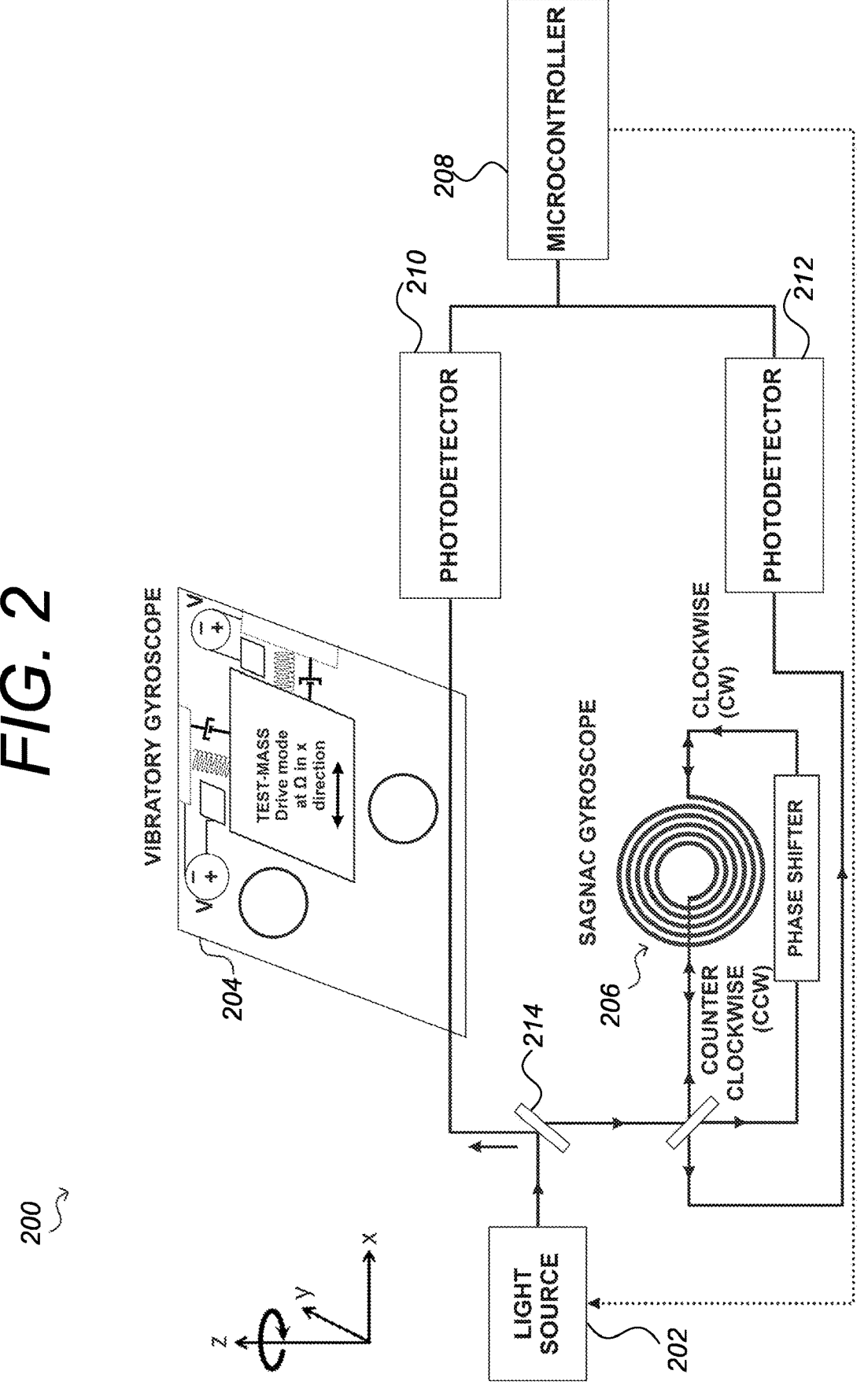
FIG. 2 shows a schematic diagram of an example inertial sensor.

FIG. 2 shows a schematic diagram of an example inertial sensor 200. The inertial sensor 200 is an example of inertial sensor 100 of FIG. 1. The inertial sensor 200 comprises an optical vibratory gyroscope 204, which is an example of the optical vibratory gyroscope 104 of FIG. 1, an optical Sagnac gyroscope 206, which is an example of the optical Sagnac gyroscope 106 of FIG. 1, and a microcontroller 208, which is an example of the microcontroller 108 of FIG. 1. The inertial sensor 200 further comprises a light source 202 and two photodetectors 210, 212. Example inner components of the optical vibratory gyroscope 204 and optical Sagnac gyroscope 206 are illustrated in FIG. 2 to show an example of the connections between the gyroscopes, the light source 202 and the detectors 210, 212. These inner components will be explained in more detail below.

The light source 202 is for transmitting light into the optical vibratory gyroscope 204 and the optical Sagnac gyroscope 206. The same light source 202 is used to transmit light into both gyroscopes. The light source is split by a beamsplitter 214 or directional coupler into two portions, the first portion transmitted into the optical vibratory gyroscope 204 and the second portion transmitted into the optical Sagnac gyroscope 206. As the rate of rotation can be detected by both gyroscopes using changes in resonance, the light output from the light source can be scanned across the optical resonances to enable detection of rate of rotation by both gyroscopes. Alternatively, light of a fixed wavelength can be used and intensity changes of the light in each gyroscope due to rotation can be detected.

The microcontroller 108 may control the light source 202, for example, to stabilise the light source. The light source 202 may be a laser. The microcontroller 108 may use laser stabilization techniques to stabilise the laser. Such laser stabilization techniques improve the stability of the output of the inertial sensor 200 by providing low noise and low drift of the output intensity and frequency. In other examples, the light source 102 may be external to the inertial sensor 200.

The photodetector 210 receives light from the optical vibratory gyroscope 204 and the photodetector 212 receives light from the optical Sagnac gyroscope 206. The photodetectors then output signals to the microcontroller 208. The microcontroller 208 then determines, based on these signals, a corrected first rate of rotation of the inertial sensor 200 about the axis. The microcontroller 208 may then provide the corrected first rate of rotation as an output from the inertial sensor 200. The microcontroller may also control the optical vibratory gyroscope 204 and optical Sagnac gyroscope 206 to ensure they are functioning correctly and to reduce errors, as discussed further below.

In one example, the light received by the photodetector 210 from the optical vibratory gyroscope 204 is the main signal and the light received by the photodetector 212 from the optical Sagnac gyroscope 206 is the supplementary signal. In this example, the signals output from the photodetectors 210, 212 to the microcontroller 208 are the one or more inputs. In another example, the photodetector 210 may be integrated in the optical vibratory gyroscope 204 and the photodetector 212 may be integrated in the optical Sagnac gyroscope 206. In this example, the main signal output by the optical vibratory gyroscope 204 may be the signal output by the photodetector 210 integrated in the optical vibratory gyroscope 204 and the supplementary signal output by the optical Sagnac gyroscope 206 may be the signal output by the photodetector 212 integrated in the optical Sagnac gyroscope 206. In this example, the one or more inputs are the main signal and supplementary signal.

Figure 3:
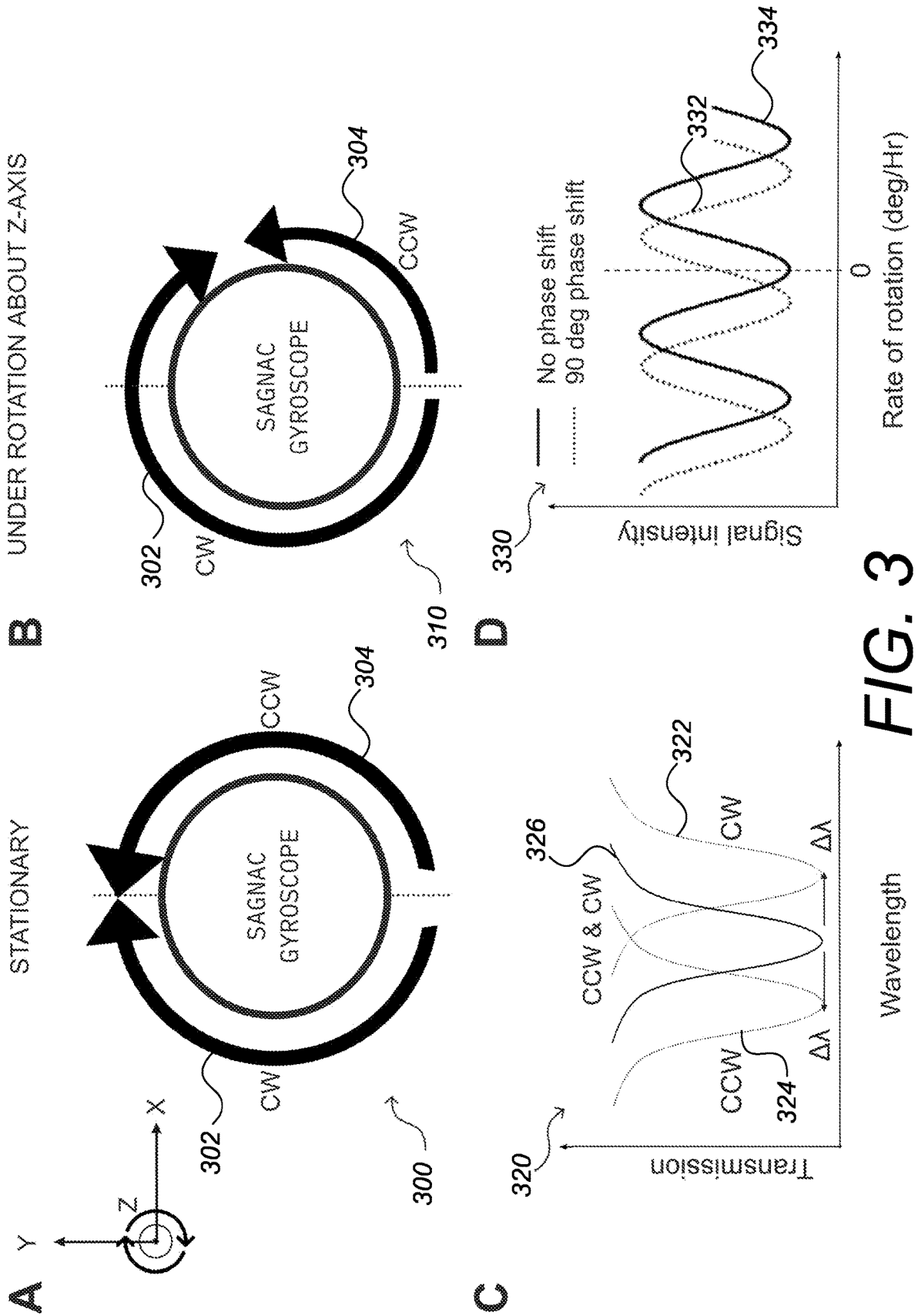
FIG. 3 shows the operation of an optical Sagnac gyroscope and example outputs of the optical Sagnac gyroscope.

FIG. 3 shows the operation of an optical Sagnac gyroscope and example outputs of the optical Sagnac gyroscope. The optical Sagnac gyroscope described in relation to FIG. 3 is an example of optical Sagnac gyroscope 206 of FIG. 2 and optical Sagnac gyroscope 106 of FIG. 1. The optical Sagnac gyroscope may be a fibre-optic gyroscope. The X, Y and Z axes are illustrated in Diagram A of FIG. 3 for case of understanding and apply to both Diagram A and Diagram B. However, it is to be understood that the directions X, Y and Z are provided for understanding and, whilst an explanation of the gyroscope is provided below where rotation is about the Z axis, the optical Sagnac gyroscope is not limited to being utilised only for measuring rate of rotation about the Z axis. Moreover, whilst an explanation of the gyroscope is provided below where rotation is clockwise, the optical Sagnac gyroscope is equally capable of measuring counter clockwise rotation.

Within the optical Sagnac gyroscope, light is transmitted into the gyroscope such that optical modes propagate in the clockwise (CW) and counter clockwise (CCW) directions. The mode chosen is usually a degenerate mode, for example, the same spatial mode but with propagation in opposite directions. For a Sagnac structure, such as a flat coil, coiled in the X-Y plane, during rotation of the optical Sagnac gyroscope about the Z axis, the optical path length for the light propagating clockwise will become different to the optical path length for the light propagating counter clockwise based on the angular velocity. This is because, due to the Sagnac effect, as the gyroscope is rotated in the same direction as either the light propagating clockwise or the light propagating counter clockwise, the light travelling against the rotation experiences a slightly shorter path delay than the light travelling in the same direction as the rotation. The change in the optical path length experienced by the CW and CCW optical modes results in a phase shift and a measurable phase difference between the optical resonances. The phase delay, and consequently the phase difference between the resonances, is dependent on the size and direction of the rotation of the gyroscope about the Z axis. For a Sagnac structure with a radius R and rotating at an angular rate $\Omega$, the resultant rotation-induced phase deviation $\Delta\varphi$ between the light propagating clockwise and counter clockwise during a round trip is $$\Delta\varphi = \frac{8\pi^2 R^2}{\lambda c}\Omega$$

where $\lambda$ is the resonant wavelength and c is the speed of light.

Diagram A 300 shows the optical Sagnac gyroscope when stationary. The axis in Diagram A 300 shows that the optical Sagnac gyroscope lies in the X-Y plane and the Z axis is effectively through the centre of the optical Sagnac gyroscope, so rotation about the Z axis is rotation in the direction in which the light is shown to propagate clockwise (CW) 302 or counter clockwise (CCW) 304 in both Diagrams A and B. As illustrated in Diagram A 300, the light propagating clockwise (CW) 302 and counter clockwise (CCW) 304 has the same optical path length when the optical Sagnac gyroscope is stationary.

Diagram B 310 shows the optical Sagnac gyroscope when under rotation about the Z axis in the clockwise direction. As illustrated in Diagram B, the optical path length of the light propagating clockwise 302 has been extended from when the gyroscope was stationary and the optical path length of the light propagating counter clockwise 304 has been reduced from when the gyroscope was stationary. Thus, in this example, as the optical Sagnac gyroscope is under rotation about the Z axis in the clockwise direction, the light propagating clockwise 302 therefore has a larger path length than the light propagating counter clockwise 304. The size of the difference between the path lengths is based on the rate of rotation. Alternatively, where the gyroscope is being rotated in the counter clockwise direction about the Z axis, the light propagating clockwise 302 would have a smaller path length than the light propagating counter clockwise 304.

One way to detect the rate of rotation about the Z axis from the change in the optical path length of the light propagating clockwise and counter clockwise is by detecting the phase difference between the light propagating clockwise and counter clockwise. This difference occurs due to a different shift in the resonance frequency of the light propagating clockwise and counter clockwise. This can be detected by scanning the laser transmitting the light into the optical Sagnac gyroscope over the resonance frequencies and detecting the resultant frequency difference of the resonance frequencies with one or more photodetectors. Graph C 320 shows the shift in resonance frequencies of the light propagating clockwise and counter clockwise. The light propagating clockwise and counter clockwise originally has the resonance curve 326. When the gyroscope is rotated clockwise about the Z axis, the resonance frequency of the light propagating clockwise shifts to a higher wavelength, as illustrated by its new resonance curve 322. Moreover, the resonance frequency of the light propagating counter clockwise shifts to a lower wavelength, as illustrated by its new resonance curve 324. Alternatively, where the gyroscope is being rotated in the counter clockwise direction about the Z axis, the resonance frequency of the light propagating clockwise would shift to a lower wavelength and the resonance frequency of the light propagating counter clockwise would shift to a higher wavelength. Thus, the amount of and direction of the shift of the resonance frequencies of the light propagating both clockwise and counter clockwise corresponds to the rate of rotation about the Z axis. Therefore the resonance frequency of the light propagating both clockwise and counter clockwise can be detected to determine the rate of rotation of the optical Sagnac gyroscope.

Another way to detect the rate of rotation about the Z axis from the change in the optical path length of the light propagating clockwise and counter clockwise is by detecting changes in the interference of the light. Graph D 330 shows the interference pattern of the counter propagating light fields, which can be obtained by a photodetector receiving both the light propagating clockwise and the light propagating counter clockwise at the same time, known as interferometric readout. The optical modes of the light propagating clockwise and counter clockwise interfere with one another which creates a cosine shaped response 334 around 0 degrees rate of rotation. To aid in measuring such an interference pattern, the optical Sagnac gyroscope may further comprise a phase shifter prior to the Sagnac structure to shift either the light propagating clockwise or the light propagating counter clockwise by 90 degrees. By shifting either the light propagating clockwise or the light propagating counter clockwise by 90 degrees, the interference pattern has a sine shaped response around 0 degrees/s rather than a cosine shaped response.

Graph D 330 shows the interferometric readout pattern with no phase shift 334, which provides a cosine shaped response, and with a 90 degree phase shift 332, which provides a sine shaped response. As shown in the Graph, when there is a 90 degree phase shift, directly before and after 0 degrees rate of rotation, there is a linear readout. This linear readout about 0 degrees rate of rotation provides ease of detection of movement of the interference pattern and enables the movement of the interference pattern in either direction to correspond to the rate of rotation about the Z axis. Moreover, the sine shaped response is asymmetric, meaning the response for rate of rotations above 0 differs to the response for rate of rotations below 0, such that, on detection, the negative and positive sign rotations can be differentiated.

The detector may detect the light from the optical Sagnac gyroscope, for example the interference pattern or difference in resonance, and send a signal to the microcontroller based on the detection. Based on the signal, the microcontroller may provide feedback to the optical Sagnac gyroscope and/or light source. In particular, the microcontroller may control the frequency of the light propagating clockwise and counter clockwise based on the supplementary signal output by the optical Sagnac gyroscope to reduce frequency changes of the light due to drifting. Thus, the output of the optical Sagnac gyroscope may also be corrected.

Figure 4:
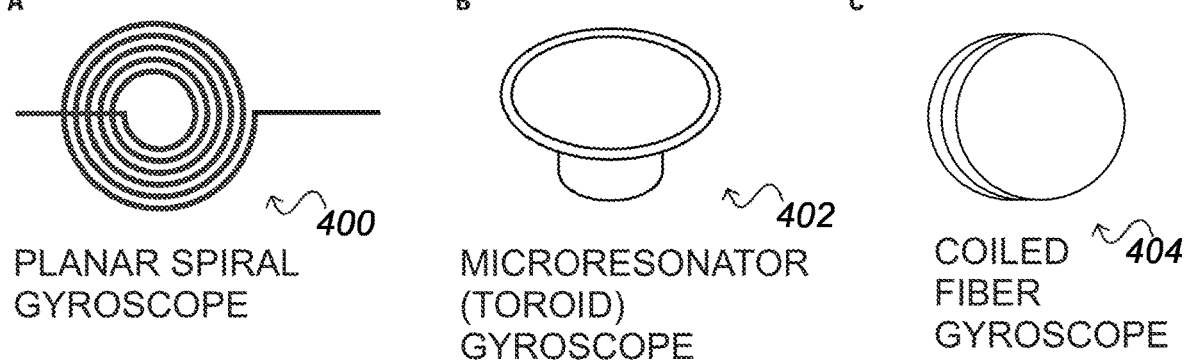
FIG. 4 shows example optical Sagnac gyroscopes.

The optical Sagnac gyroscope may comprise any Sagnac structure that can propagate light clockwise and counter clockwise. The optical Sagnac gyroscope may comprise a coiled or spiraled waveguide structure to propagate light clockwise and counter clockwise. For example, the optical Sagnac gyroscope may be a coiled piece of optical fiber, a spiral or coil made directly on-chip from rectangular waveguides, or a bulk microdisk structure on-chip. For the microdisk structure, the Sagnac gyroscope may further comprise a waveguide to provide evanescent coupling to the microdisk. These Sagnac structures are chip-scale and so can be integrated in the same chip as the optical vibratory gyroscope. In particular, the diameter of the coiled or spiraled waveguide structure may be in the order of millimetres or centimetres. FIG. 4 shows example optical Sagnac gyroscopes. These optical Sagnac gyroscopes are examples of the optical Sagnac gyroscope 106 of FIG. 1 or 206 of FIG. 2 and may operate as explained in relation to FIG. 3. These gyroscopes all comprise different Sagnac structures. Image A is a planar spiral gyroscope 400, which comprises a waveguide structure etched from a single layer. Image B is a microresonator gyroscope 402 in the shape of a toroid, however this type of gyroscope may also be disk shaped. Image C is a coiled fibre gyroscope 404, which is an optical fibre wound in multiple layers.

The optical Sagnac gyroscope has no moving parts and therefore has high stability and a large sensing range. Over time, the drift of the accuracy is very small, so the optical Sagnac gyroscope can be used for longer periods of time without significant long term drift and consequently can be used to reset the error of the vibratory gyroscope.

Figure 5:
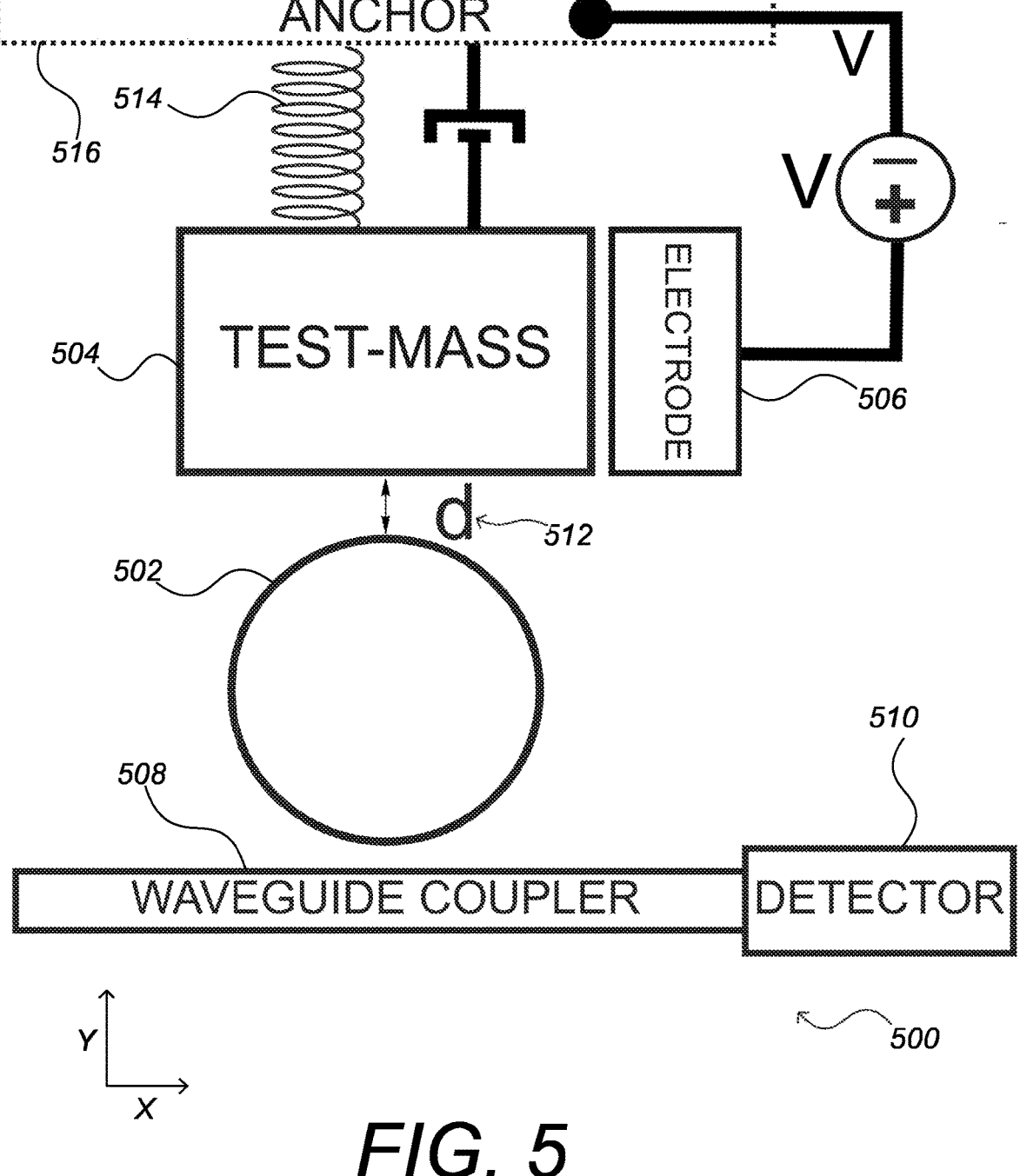
FIG. 5 shows a diagram of an example optical vibratory gyroscope.

FIG. 5 shows a diagram of an example optical vibratory gyroscope 500. The optical vibratory gyroscope 500 may also be known as a micro-opto-electro-mechanical systems (MOEMS) vibratory gyroscope. FIG. 5 illustrates an X-Y axis for understanding, however, the optical vibratory gyroscope 500 is not limited to movement in these axes. The optical vibratory gyroscope 500 is an example of optical vibratory gyroscope 204 of FIG. 2 and optical vibratory gyroscope 104 of FIG. 1.

The optical vibratory gyroscope 500 comprises a microresonator 502 that supports an optical resonance. The optical vibratory gyroscope 500 further comprises a micro-electro-mechanical inertial test mass 504 suspended adjacent to and non-contiguous with the microresonator 502. That is, the test mass 504 is arranged within the optical vibratory gyroscope 500 such that it is close to the microresonator 502 but separated from the microresonator 502 by a distance/spacing "d" (labelled 512 in FIG. 5). The test mass 504 is deflectable under the application of an inertial force. That is, under the influence of an inertial force the spacing 512 between the test mass 504 and the 502 may change temporarily. Rotation of the gyroscope 500 causes the application of an inertial force on the gyroscope 500. The optical vibratory gyroscope 500 further comprises an electrode 506 for counteracting a deflection of the test mass 504 with an electrostatic force. The optical vibratory gyroscope 500 further comprises an optical coupler 508 for coupling light into and out of the microresonator 502. The optical vibratory gyroscope 500 further comprises a detector 510 for detecting light received from the microresonator 502 by the optical coupler 508. A change in the spacing 'd' 512 between the test mass 504 and microresonator 502 causes a change in the optical resonance characteristics of that microresonator 502.

The optical vibratory gyroscope 500 detects the inertial force caused by rotation based on the displacement of the test mass 504 as it moves in response to the inertial force. In more detail, the optical vibratory gyroscope 500 of FIG. 5 operates as follows. When the optical vibratory gyroscope 500 is rotated, for example as part of the inertial sensor, the optical vibratory gyroscope 500 rotates to a particular angle. The test mass is suspended by suspension means 514, which in this example is a spring, connected to an anchor 516. The test mass 504 responds to the inertial force caused by rate of rotation and is displaced based on the size and direction of the inertial force. The displacement of the test mass 504 may be proportional to the inertial force caused by rate of rotation. This displacement changes the gap 'd' 512 between the test mass 504 and microresonator 502 which causes a change in the optical resonance characteristics of that microresonator 502. The optical coupler 508 receives light from and couples the light to the microresonator 504. One or more characteristics of the light coupled from the microresonator 504 change based on the change in the optical resonance characteristics of the microresonator 504 and such a change is detected at the detector 510. This change in the transmission output at the detector 510 is related to the displacement of the test mass and consequently can be used to compute the inertial force experienced by the optical vibratory gyroscope 500 due to rotation. Thus, the microresonator 504, optical coupler 508, detector 510, test mass 504, spring 514 and anchor 516 together form the gyroscope's optomechanical readout mechanism and enable the determination of inertial force, and thus rate of rotation, based on the detected change in optical transmission at the detector 510. The gyroscope 500 may be driven and packaged in vacuum to increase the mechanical quality factor and thus the sensitivity of the gyroscope 500.

To be able to control the movement of the test mass 504, an electrode 506 is provided and a voltage may be applied to the electrode 506. The electrode 506 is configured to output an electrostatic force due to the applied voltage to actuate the test mass 504. The size of the electrostatic force is based on the size of the applied voltage. As the size of the actuation is based on the size of the electrostatic force, the size of the actuation is also based on the applied voltage and can be controlled by differing the voltage applied to the electrode 506. Thus, the electrode 506 can change the position of the test mass 504 with respect to the microresonator by moving the test mass 504 using the electrostatic force from the applied voltage. Such actuation may be referred to as capacitive actuation. The electrode 506 may be fixed with respect to the gyroscope 500. The electrode may move the test mass in the X direction and/or the Y direction, the X and Y direction being indicated in FIG. 5. The electrode may also move the test mass in the Z direction (not shown).

The test mass 504 will have an initial position, which is its initial location relative to the other components of the gyroscope 500 when there is no inertial force exerted on it. The use of the initial position in calculating the rate of rotation is explained below in relation to FIG. 6. However, when the test mass 504 is displaced due to an inertial force multiple times, the test mass begins to respond non-linearly and may drift over time. Drift is when the test mass does not return to its initial position after being displaced. Thus, drift causes a change in the location of the test mass when there is no inertial force exerted on it. The size of the drift is the distance between the test mass when there is no inertial force exerted on it and its initial position. Over time, drift increases and so the distance between the test mass position and its initial position increases. As rate of rotation calculations are based on the test mass position change from its initial position, the drift of the test mass causes long term errors at the output of the optical vibratory gyroscope.

Drift may be due to the sensitivity of the test mass 504 to vibrations and linear acceleration. Drift may be due to thermal changes to the test mass and may be thermally induced, i.e. due to temperature changes of the gyroscope. Drift may be due to asymmetrical fabrication or damping.

To remove the errors caused by drift, the drift can be determined using the output of the optical vibratory gyroscope 500 and the output of the optical Sagnac gyroscope. The determined drift can then be utilised during calculations to correct the output of the optical vibratory gyroscope 500. Additionally or alternatively, the drift can be reduced by actuating the test mass, as described below, such that it is closer to the initial position. Thus, the use of both gyroscope outputs aids in reducing errors in the output of the optical vibratory gyroscope.

The optical vibratory gyroscope 500 implements a closed loop system using the feedback mechanism of the electrode 506 actuating the test mass. The actuating force of the electrode 506 can be used to actively restore the test-mass back to its initial position, extending the linearity and sensing range, and reducing or counteracting the drift. The actuation force from the electrode 506 can be adjusted using feedback to ensure the test mass 504 is in the position that would provide the optimal sensor measurement. Thus, the electrode 506 improves the long-term stability of the gyroscope. The electrode 506 may also be used to dampen any vibration of the test mass 504. The optomechanical reading combined with the electromechanical control provides a highly sensitive optical vibratory gyroscope 500. The combination of the optical Sagnac gyroscope to determine the drift and the electrode 506 to actuate the test mass based on the drift further improves the long-term stability of the gyroscope.

Whilst only one of each component of the optical vibratory gyroscope 500 is illustrated in FIG. 5, the optical vibratory gyroscope 500 may comprise a plurality of each component. The optical vibratory gyroscope 500 may comprise a plurality of microresonators 502, electrodes 504, springs 514, anchors 516 and optical couplers 508. The microresonator may be fixed relative to the gyroscope 500. In FIG. 5, the test mass 504 is positioned radially from the microresonator 502, however, the test mass 504 may be located in other positions relative to the microresonator 502.

The optical resonance characteristics change due to the displacement of the test mass 504. The change in optical resonance characteristics may be a shift in resonance wavelength and/or a broadening or deepening of the curve of the optical resonance in response to the test mass moving with respect to the microresonator. The shift may occur in either direction to progressively become either red detuned or blue detuned. The broadening or deepening is due to a change in optical losses, for example, dissipative or scattering optomechanical coupling, as explained below in relation to FIG. 6.

As illustrated in FIG. 5, the test mass may be suspended using suspension means 514 in the form of a spring. One end of the spring is fixed relative to the gyroscope by being connected to an anchor 516 and the other end of the spring is connected to the test mass and suspends the test mass. The spring 514 enables displacement of the test mass 504. Whilst the spring 514 and anchor 516 have been illustrated in this Figure, the skilled person would appreciate that other types of suspension means can be used within the optical vibratory gyroscope 500 instead of the spring 514 and anchor 516.

The microresonator 502 is placed close to the test mass 504 such that the deflection of the test mass 504 causes a change in the optical resonance characteristics of that microresonator 502.

The electrostatic actuation provided by the electrode 506 may be controlled by a controller (not shown in FIG. 5) as described further below. The optical vibratory gyroscope 500 may comprise the controller or the controller may be external to the optical vibratory gyroscope 500. For example, the microcontroller 108 of FIG. 1 or the microcontroller 208 of FIG. 2 may control the electrostatic actuation provided by the electrode 506.

As illustrated by the voltage source in FIG. 5, a voltage is applied to the electrode 506. The anchor may be grounded such that the applied voltage is the potential difference between the electrode 506 and the anchor 516. The voltage applied may change based on the electrostatic force required for counteracting the deflection of the test mass 504. Thus, whilst a voltage source is illustrated in FIG. 5, the voltage may instead be applied by the controller mentioned above (not shown in FIG. 5).

The detector 510 may be any device that converts an optical signal into an electrical signal. The detector 510 may be a photodetector. The detector 510 may comprise a processor for processing the optical signal to calculate the inertial force sensed by the gyroscope. The detector 510 may receive the optical signal from the optical coupler 508 and microresonator 502 as its input and output the inertial force measurement. Alternatively, the controller mentioned above (not shown in FIG. 5) may be used to calculate the inertial force based on the optical signal detected by the detector 510. Whilst the optical vibratory gyroscope 500 of FIG. 5 comprises a detector 510, the detector may instead be outside of the gyroscope, as illustrated by detector 210 in the inertial sensor 200 of FIG. 2.

The optical coupler 508 may be coupled to a waveguide. The optical coupler 508 may be a waveguide that is arranged in close proximity to the microresonator 502 such that light is coupled from the waveguide to the microresonator 502 and from the microresonator 502 to the waveguide. Light from a light source (not shown in FIG. 5) may be input into the optical coupler 508 to be transmitted into and out of the microresonator 502 to the detector 510. The optical vibratory gyroscope may comprise the light source. Alternatively, the light source may be external to the optical vibratory gyroscope and may transmit light into both the optical vibratory gyroscope and optical Sagnac gyroscope, as illustrated in inertial sensor 200 of FIG. 2. The light input into the optical coupler 508 may be broadband light or coherent single frequency light.

The test mass 504 is displaced towards or away from the microresonator, for example, along the Y axis. The test mass 504 may, additionally or alternatively, be displaced laterally with respect to the microresonator, for example, along the X axis. The test mass may be made of silicon.

The microresonator 502 illustrated in FIG. 5 is a ring resonator, however this microresonator can be replaced with another type of microresonator 502 such as a disk microresonator or a racetrack microresonator.

The microresonator 502 illustrated in FIG. 5 has at least a portion of an evanescent field extending beyond the edge of the microresonator 502 when the gyroscope is in use. The evanescent field may extend by 1 micron from the edge of the microresonator 502. The evanescent field extending substantially from the edge of the microresonator 502 enhances the sensitivity of the gyroscope as the interaction between the evanescent field and test mass 504 is increased.

The microresonator 502 may be a whispering gallery mode microresonator. When the microresonator is a whispering gallery mode microresonator, it traps light as a whispering gallery mode optical resonance and has an evanescent field extending beyond its edge. As the test mass 504 displaces, it will interact with the evanescent field and alter the properties of the microresonator as it interacts with the evanescent field, changing the effective refractive index of the microresonator. This change shifts the whispering gallery mode optical resonance of the microresonator. Thus, when the test mass 504 moves within the evanescent field of the whispering gallery mode microresonator, the optical resonance of the microresonator is perturbed and the characteristics of the optical resonance are changed.

Figure 6:
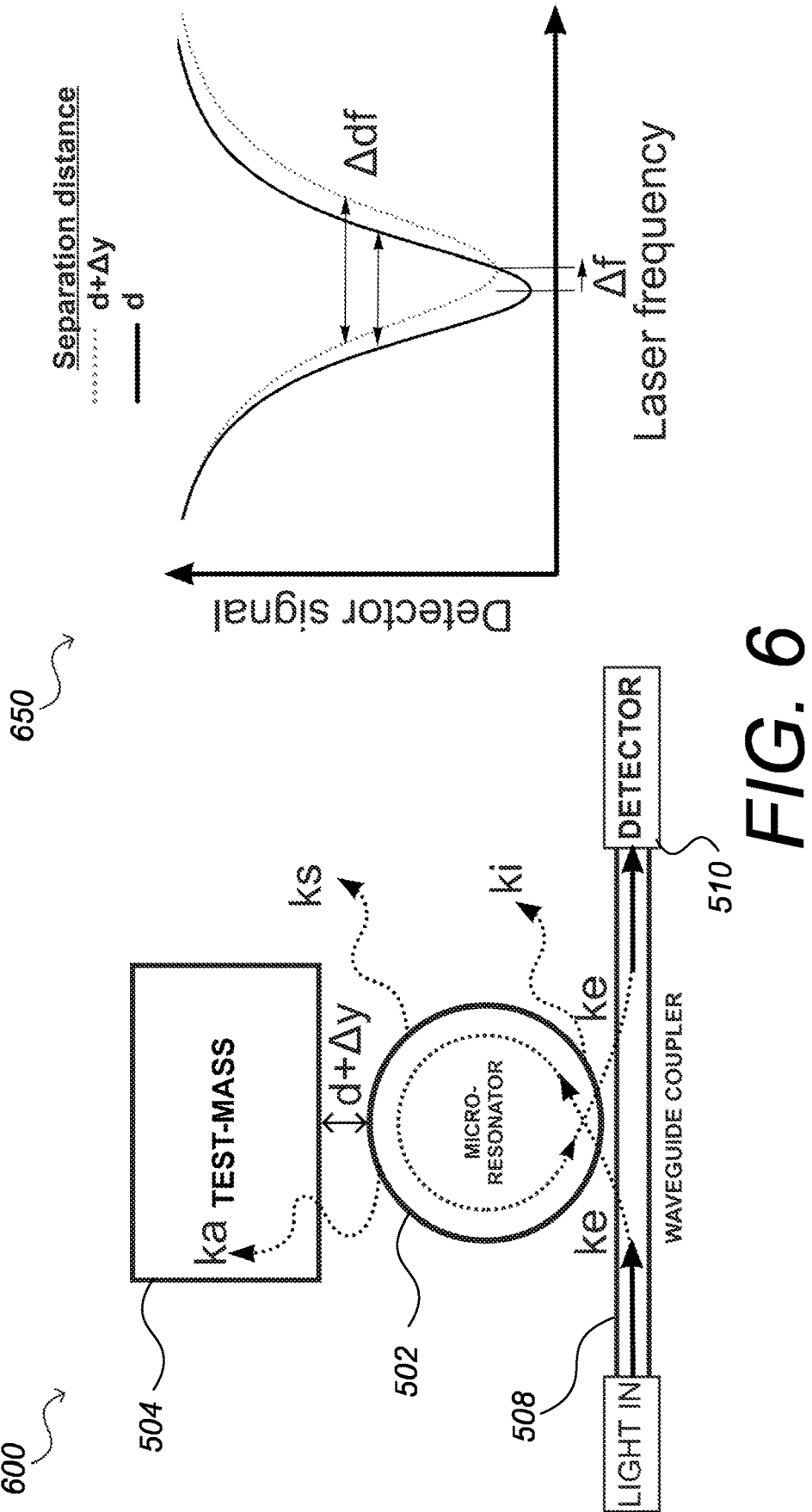
FIG. 6 shows a diagram of the optomechanical element of the optical vibratory gyroscope of FIG. 5 and an example output of the optical vibratory gyroscope.

FIG. 6 shows a diagram of the optomechanical element 600 of the optical vibratory gyroscope 500 of FIG. 5 and an example output 650 of the optical vibratory gyroscope. The illustration of FIG. 6 is to aid in understanding of the operation of the optomechanical element of the optical vibratory gyroscope 500 and therefore does not include all the components of the optical vibratory gyroscope 500 of FIG. 5. The following explanation is for when the microresonator 502 is a whispering gallery mode (WGM) microresonator, however, it should be understood that the microresonator 502 of FIG. 5 may be a different type of microresonator. The WGM microresonator has an evanescent field. The Figure shows the coupling rates $k_i$, $k_e$, $k_a$ and $k_s$ which can be used to model the rate of transfer of the photons.

Light is exchanged from the optical coupler 508 to the microresonator 502 and then back from the microresonator 502 to the optical coupler 508 at a rate defined by extrinsic coupling rate $k_e$, as shown by the arrows entering and leaving the microresonator 502. The extrinsic coupling rate, for example, defines the change in the (slowly varying part of the) normalised intracavity electromagnetic field per second, in units of Hertz. When light enters the microresonator 502, it leaks out due to internal losses defined by an intrinsic loss rate of $k_i$. The test mass may be displaced by an inertial force caused by rotation of the gyroscope. The displacement of the test mass is based on the size and direction of the inertial force. If a test mass 504 approaches the edge of the microresonator 502 at a distance 'd', the test mass 504 is displaced within the evanescent field and interacts with the evanescent field, causing a change in the effective refractive index of the WGM microresonator which shifts the resonant frequency of the microresonator 502. The physical presence of the test mass causes some photons to leak out of the microresonator 502 due to both scattering effects, resulting in scattering loss (characterised by $k_s$), and light coupling into the test mass through absorption or being guided away, as illustrated by coupling loss $k_a$ in FIG. 6. For example, photons may be absorbed and/or scattered on interaction with the surface of the test mass due to surface roughness. The displacement of the test mass 504 alters the scattering loss $k_s$ because $k_s$ has an exponential dependence on the distance 'd' between the test mass 504 and the microresonator 502 as shown in the following equation, with alpha being the effective decay length of the evanescent field and $k_{s0}$ being a constant:

$$k_s = k_{s0}e^{-alpha*d}$$

The displacement of the test mass 504 also alters the coupling loss $k_a$ for corresponding reasons. The displacement of the test mass 504, and consequently the change in distance 'd' between the test mass 504 and the microresonator 502, changes the refractive index and consequently changes the detuning $\Delta$. The detuning $\Delta$ refers to the detuning of the light from the initial WGM resonance frequency $\omega_0$ and can be defined as $\Delta=\omega-\omega_0$. Thus, as the optical resonance of the microresonator is shifted, the detuning is changed.

Accordingly, the changes in the effective refractive index of the WGM microresonator 502 and the coupling rates cause a frequency shift and broadening of the WGM resonance. In particular, the WGM optical resonance is broadened by the scattering coupling rate $k_s$ and/or the absorption or transmission coupling rate $k_a$ and shifted by the change in effective refractive index which causes a change in detuning $\Delta$.

The transmitted light intensity T at the output of the optical coupler 508 changes based on the position of the test mass 504 due to the change in WGM optical resonance. As shown in the following equation, in this model T depends on the coupling rates and the detuning and is normalised to 1:

$$T = \left| 1 - \frac{k_e}{\frac{k_i}{2} + \frac{k_e}{2} + \frac{k_a}{2} + \frac{k_s}{2} + i\Delta} \right|^2$$

The measurement of the transmission intensity taken at the detector 510 may be compared to a previous value or a reference value to find the change in transmission. This enables the change in optical resonance to be detected. The change in optical resonance is indicative of the displacement of the test mass. Consequently, from the detection of the change in optical resonance, the inertial force on the test mass can be computed. The rate of rotation of the gyroscope can then be determined from the inertial force.

In summary, an inertial force exerted during rotation of the gyroscope may cause a displacement of the test mass, the displacement being based on the size and direction of the inertial force. The displacement of the test mass 504 and consequent change in distance between the test mass 504 and microresonator 502 causes a change in the coupling rates and the refractive index of the microresonator 502 which causes a change in the detuning. The change in detuning changes the intracavity electromagnetic field and light intensity at the output of the waveguide coupler. Consequently, changes in the optical resonance frequency of the microresonator 502 are detectable at the detector 510. The graph 650 of FIG. 6 illustrates such a change.

In the initial position of the optical vibratory gyroscope 500, when there is no inertial force incident on the gyroscope 500, the test mass 504 is located at a distance d from the microresonator 502. The detection signal when the test mass 504 is located at a distance d from the microresonator 502 is shown by the solid line in the graph 650 of FIG. 6. When there is an inertial force due to rotation of the gyroscope 500, the test mass 504 may be displaced away from the microresonator 502 by $\Delta y$ and so is at a distance of $d+\Delta y$ from the microresonator 502. The detection signal when the test mass 504 is located at a distance $d+\Delta y$ from the microresonator 502 is shown by the dotted line in the graph 650 of FIG. 6. As illustrated in the graph 650, there is a change in resonant frequency $\Delta f$ between the solid line (corresponding to the initial distance between the test mass 504 and the microresonator 502) and the dotted line (corresponding to the distance of the test mass 504 from the microresonator 502 after deflection under the inertial force) caused by a change in the effective refractive index of the microresonator 502. There is also a change in the resonance linewidth $\Delta df$ caused by light leaving the microresonator due to scattering (linked to coefficient $k_s$) and/or absorption or transmission (linked to coefficient $k_a$).

In order to detect the inertial force from the displacement of the test mass 504 using the transmission output detected at the optical coupler 508, a scale factor may be defined, for example, a change in transmission per nanometer of displacement. The relation between transmission and displacement is provided above in relation to FIG. 6 and shows that the transmission, and therefore the scale factor, is based on the coupling rates and the detuning.

To measure the inertial force, an equilibrium position may be determined. This may be or correspond to the separation distance between the test mass 504 and microresonator 502 when the test mass 504 is at its initial position. Small motions about the equilibrium position can then be detected. As such small motions are detected about an equilibrium position, the response is substantially linear for these motions.

However, the initial position of the test mass 504 may change over time, which changes the equilibrium position. For different equilibrium positions, the optomechanical coupling rates are different due to the exponential intensity distribution of the evanescent field around the resonator. Therefore, when the initial position of the test mass changes, the equilibrium position changes and consequently the scale factor of the gyroscope 500 is changed. Closed loop operation attempts to maintain the initial position and consequently the scale factor. Moreover, comparing the output of the optical vibratory gyroscope with the output of the optical Sagnac gyroscope can be used to attempt to maintain the initial position. This is because the comparison enables any errors due to changes in the initial position to be detected. The test mass can then be actuated based on the detected errors to return it to the initial position.

Figure 7:
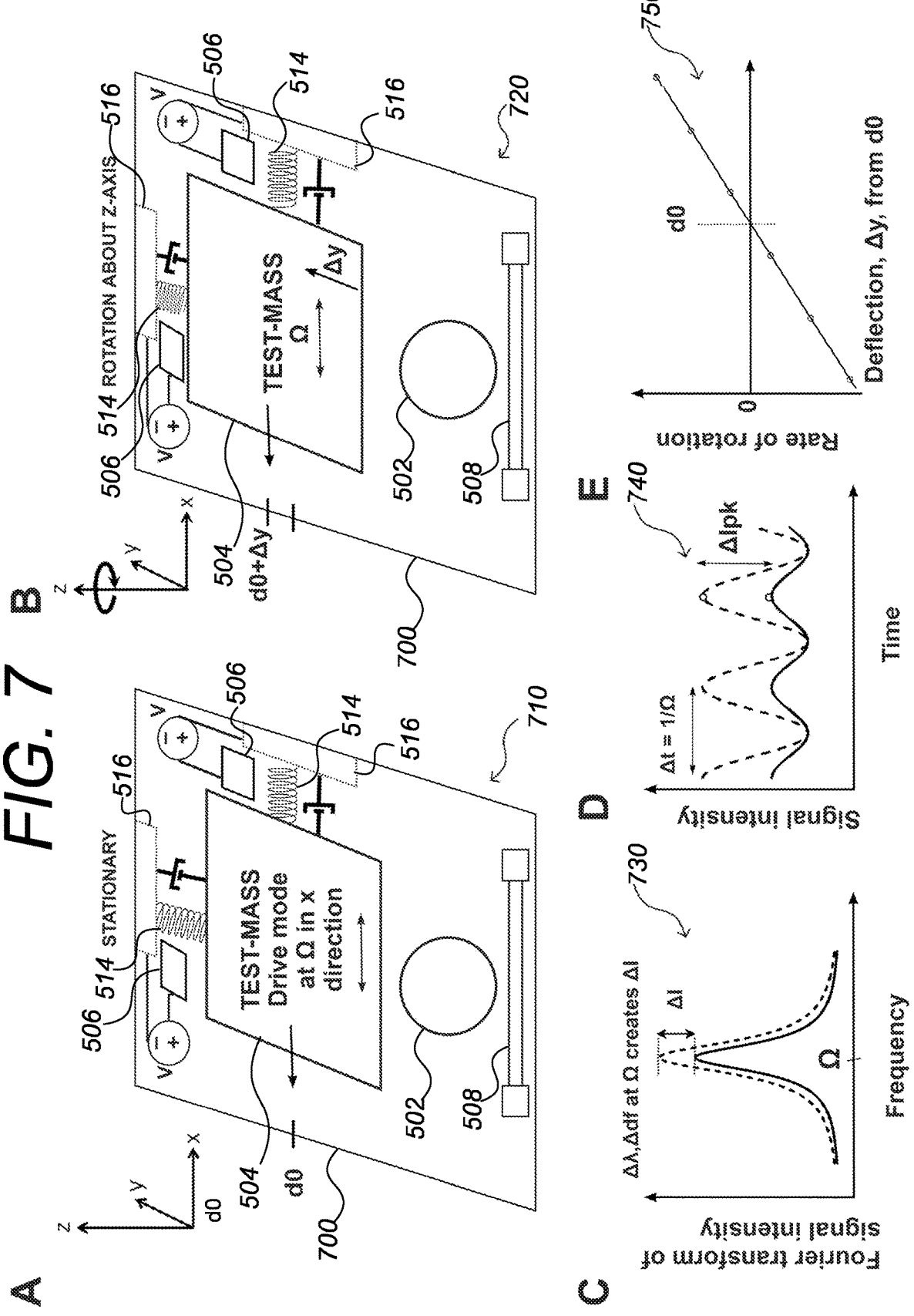
FIG. 7 shows a diagram of an example optical vibratory gyroscope and example outputs of the optical vibratory gyroscope before and during rotation.

FIG. 7 shows a diagram of an example optical vibratory gyroscope 700 and example outputs of the optical vibratory gyroscope 700 before and during rotation. The optical vibratory gyroscope 700 is an example of optical vibratory gyroscope 500 of FIG. 5. The optical vibratory gyroscope 700 comprises the components of the optical vibratory gyroscope 500 of FIG. 5. The optical vibratory gyroscope 700 further comprises another spring 514, anchor 516 and electrode 506 that operate perpendicular to the original spring 514, anchor 516 and electrode 506 of FIG. 5.

Rate of rotation is sensed using the Coriolis effect on a vibrating gyroscope structure. Thus, the optical vibratory gyroscope 700 may also be known as the Coriolis gyroscope. To measure rate of rotation, the test mass 504 is driven in a first direction, for example along the X axis, to vibrate at a frequency $\Omega$. Due to the Coriolis effect, rotation about the Z axis causes a displacement along the Y axis at the frequency $\Omega$. The rate of rotation can then be determined by finding the change in amplitude of the oscillation of the test mass 504 in the Y axis at the frequency $\Omega$.

Image A 710 shows the optomechanical element when the gyroscope 700 is not rotating, for example, when the gyroscope 700 is stationary, and Image B 720 shows the optomechanical element when the gyroscope 700 is rotated about the Z axis. It is to be understood that the directions X, Y and Z are provided for understanding and the gyroscope is not limited to being utilised only for measuring rate of rotation about the Z axis.

As illustrated in Images A 710 and B 720, the optical vibratory gyroscope 700 comprises two suspension means, which in this example are springs 514, positioned substantially perpendicular to each other to allow for motion in two perpendicular directions. This enables the test mass to move in two degrees of freedom, perpendicular to one another. The movement in two degrees of freedom is needed to ensure the gyroscope can operate in a sensing mode and a drive mode, as explained below. As shown in Image B 720, when there is rotation about the Z axis, the test mass 504 is displaced along the Y axis at the frequency $\Omega$ by $\Delta y$. The difference between the initial position d0 of the test mass when the optical vibratory gyroscope 700 is not rotating and the position of the test mass when the gyroscope 700 is rotating about the Z axis is therefore $\Delta y$.

Graphs C 730 and D 740 show example outputs of the optical vibratory gyroscope 700 before and during rotation. For graphs C 730 and D 740, the solid line represents when the optical vibratory gyroscope 700 is not rotating and the dashed line represents when the optical vibratory gyroscope 700 is rotating about the Z axis. Graph C 730 illustrates the Fast Fourier Transform (FFT) of the signal at the output of the optical coupler and shows the maximum amplitude is at the frequency $\Omega$ as the test mass 504 responds at the same frequency as the driven motion along the X axis. Graph C 730 also illustrates a change in amplitude of the signal $\Delta I$ at the frequency $\Omega$ from when the gyroscope is not rotating to when the gyroscope is rotated about the Z axis.

Upon rotation, the Coriolis force leads to an amplitude modulated vibration in the Y axis at the frequency $\Omega$. This is shown in graph C 730 by the increase $\Delta I$ in the amplitude of the signal at the frequency $\Omega$ from when the gyroscope is stationary to when it is rotating. By finding the change in amplitude $\Delta I$ of the signal, the Coriolis force can be found using known equations and, from this, the rate of rotation can be determined.

Graph D 740 illustrates the signal intensity of the output from the optical coupler 508 over time. As the test mass 504 is driven along the X axis at the frequency $\Omega$, a small portion of this signal is detected in the Y axis, as shown in graph D 740, which also has a frequency of $\Omega$. Graph D 740 also shows the increase in amplitude of the frequency as explained above in relation to graph C 730. In particular, the difference $\Delta I_{pk}$ between the peak amplitudes of the non-rotating gyroscope and rotating gyroscope are clearly shown in graph D 740.

Graph E 750 shows the linear relationship between the rate of rotation of the optical vibratory gyroscope 700 about the Z axis and the deflection $\Delta y$ of the test mass 504 from the initial position d0 along the Y axis.

The change in distance between the microresonator and the test mass causes a change in resonant frequency characteristics of the microresonator which changes the transmission output from the optical coupler at the detector. From the change in transmission at the detector, the change in resonant frequency can be detected, as explained in relation to FIG. 6. As the change in resonant frequency is based on the displacement of the test mass, the change in amplitude of the signal at the frequency $\Omega$ can be determined and so the Coriolis force can be determined and consequently the rate of rotation can be measured.

The optical vibratory gyroscope 700 has a sensing mode and a driving mode that are performed simultaneously and in perpendicular directions. In the optical vibratory gyroscope 700, sensing mode is performed along the Y axis and driving mode is performed along the X axis. Thus, conceptually, the optical vibratory gyroscope 700 may be equated to two optical vibratory gyroscopes 500 of FIG. 5 perpendicular to each other and with a common test mass, where the main purpose of the optical vibratory gyroscope running along the X axis is for driving and the main purpose of the other optical vibratory gyroscope running along the Y axis is for sensing. For the optical vibratory gyroscope running along the X axis, as its purpose is for driving rather than sensing, the microresonator 502 and optical coupler 508 are optional and not shown in Images A 710 and B 720.

A first of each of the anchor 516, spring 514 and electrode 506 are used for the driving mode and a second of each of the anchor 516, spring 504 and electrode 506, in addition to the microresonator 502 and optical coupler 508, are used for the sensing mode. As the driving mode is along the X axis, the electrode 514 on the right of the test mass is for driving the test mass to vibrate at the frequency $\Omega$ and the spring 514 and anchor 516 to the right of the test mass in the Figure enable freedom of movement of the test mass 504 in the X direction to enable such vibration. As mentioned above, the optical vibratory gyroscope may further comprise an optical coupler 508 and microresonator 502 on the left of the test mass for sensing that the test mass is being driven at the correct frequency. The electrode 506 on the right of the test mass may also be for reducing noise and drift, as explained in relation to FIG. 5.

The sensing mode is along the Y axis with the spring 514 and anchor 516 above the test mass enabling freedom of movement of the test mass 504 in the Y direction. As explained above, when the test mass is driven at a frequency Ω in the X direction, the test mass is displaced along the Y axis by rotation about the Z axis due to the Coriolis effect. When the test mass is displaced along the Y axis by Δy, the electrode 506 on the top of the test mass is for actuating the test mass along the Y axis to reduce drift and noise as explained in relation to FIG. 5.

The displacement of the test mass 504 along the Y axis changes the spacing between the test mass 504 and the microresonator 502 below the test mass 504. This causes a change in optical resonance characteristics of the microresonator 502 below the test mass 504 and consequently a change in the transmission output detected from the optical coupler 508 below the microresonator by a detector (not shown).

As mentioned above, the electrodes 506 on the top of the test mass and/or to the right of the test mass are controlled to reduce noise and drift, that cause errors at the output of the gyroscope 700. Comparison of the output of the optical Sagnac gyroscope and optical vibratory gyroscope enable the size of the drift to be determined such that it can be reduced by the electrodes 506. Thus, the Sagnac readout minimizes detrimental errors caused by the Coriolis mechanism.

Figure 8:
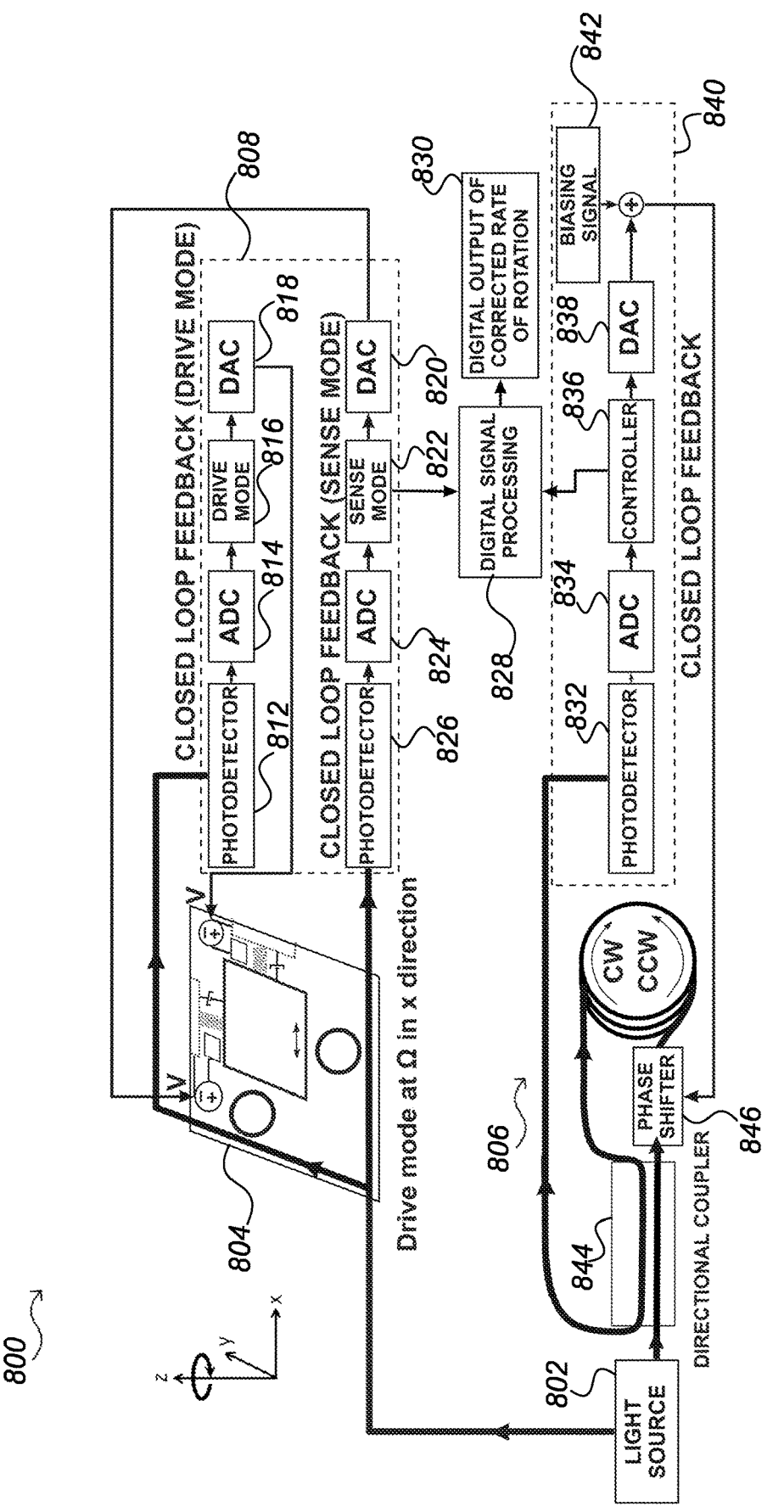
FIG. 8 shows a schematic diagram of an example inertial sensor implementing a closed loop feedback system.

FIG. 8 shows a schematic diagram of an example inertial sensor 800 implementing a closed loop feedback system. The inertial sensor 800 is an example of inertial sensor 100 of FIG. 1 and inertial sensor 200 of FIG. 2. The closed loop feedback system comprises closed loop feedback 808 for the optical vibratory gyroscope 804 and closed loop feedback 810 for the optical Sagnac gyroscope 806. The components of the closed loop feedback 808 may be within the optical vibratory gyroscope 804 or external to the optical vibratory gyroscope 804 but within the sensor 800. The components of the closed loop feedback 810 may be within the optical Sagnac gyroscope 806 or external to the optical Sagnac gyroscope 806 but within the sensor 800. The optical vibratory gyroscope 804 is shown in the Figure to be optical vibratory gyroscope 700 of FIG. 7 with the optional microresonator 502 and optical coupler 508. The optical Sagnac gyroscope 806 is shown in the Figure to have a coiled waveguide structure. However, it will be appreciated that the optical vibratory gyroscope 804 may be any optical vibratory gyroscope and the optical Sagnac gyroscope 806 may be any optical Sagnac gyroscope.

The inertial sensor 800 comprises two photodetectors 812, 826 for receiving light from the optical vibratory gyroscope 804. Light from the light source 802 is split in order to be input into the optical couplers 508 on the left and below the test mass 504.

The first photodetector 812 is for receiving light from the microresonator 502 via the optical coupler 508 on the left of the test mass for sensing that the test mass is being driven at the correct frequency. The second photodetector 826 is for receiving light from the microresonator 502 via the optical coupler 508 below the test mass for sensing the change in optical resonance characteristics of the microresonator 502 caused by the displacement of the test mass 504 along the Y axis, and thus for measuring the rate of rotation.

Thus, the first photodetector 812 output is converted to a digital output by an analog to digital converter 814. The digital signal output from the analog to digital converter 814 is then compared to the signal that should be received if the test mass is being driven at the correct frequency by the drive mode controller 816. Based on the comparison, the drive mode controller 816 outputs a digital feedback signal to correct any error in the driving signal to ensure the test mass is being driven at the correct frequency. This digital feedback signal is converted to an analog signal by the digital to analog converter 818. The digital to analog converter 818 then provides the converted analog signal to the electrode 506 on the right of the test mass 504 to control the voltage of the electrode and thus control the driving signal.

The second photodetector 826 output is converted to a digital output by an analog to digital converter 824. The digital signal output from the analog to digital converter 824 is then input into a sense mode controller 822 to determine any errors in the measurement, for example, due to drift. Based on the determination, the sense mode controller 822 outputs a digital feedback signal to reduce errors in the measurements by actuating the test mass, as described above in relation to FIG. 5. This digital feedback signal is converted to an analog signal by the digital to analog converter 820. The digital to analog converter 820 then provides the converted analog signal to the electrode 506 above the test mass 504 to control the voltage of the electrode and thus actuate the test mass accordingly.

The sense mode controller 822 also outputs a signal based on the detected transmission output from the optical coupler 508, that corresponds to the rate of rotation of the sensor 800, to a digital signal processor 828 to determine the rate of rotation of the sensor 800.

The inertial sensor 800 comprises a photodetector 832 for receiving light from the optical Sagnac gyroscope 806. Light from the light source 802 is split by a directional coupler 844 such that light propagating both clockwise and counter clockwise is input into the Sagnac structure. For example, the coupler 844 may take a portion of the input laser light and send it to the clockwise optical resonance whilst the remainder of the input laser light is the counter clockwise optical resonance. The light propagating either clockwise or counter clockwise is phase shifted by phase shifter 846 before entering the Sagnac structure, as explained in relation to FIG. 3. The light output from the Sagnac structure then propagates back through the directional coupler 844 onto the photodetector 832. Alternatively, the light propagating clockwise and counter clockwise may interfere in the directional coupler, and this interference signal may be sent to the photodetector 832.

The photodetector 832 output is converted to a digital output by an analog to digital converter 834. The digital signal output from the analog to digital converter 834 is then input into a controller 836 to determine any errors in the frequency or phase of the input light. Based on the determination, the controller 836 outputs a digital feedback signal to reduce errors in the input light and to keep the sine shaped response described in relation to FIG. 3 using the phase shifter. This digital feedback signal is converted to an analog signal by the digital to analog converter 838. The digital to analog converter 838 then provides the converted analog signal to be combined with the biasing signal 842. The biasing signal 842 provides the voltage required by the phase shifter 846 to initially set the phase shift to 90 degrees. The converted analog signal is added to, or subtracted from, this voltage and the resultant signal is provided to the phase shifter 846 to maintain the 90 degree phase shift in order to reduce errors in the input light.

The controller 836 also outputs a signal based on the detected transmission output from the optical Sagnac gyroscope, that corresponds to the rate of rotation of the sensor 800, to the digital signal processor 828.

Thus, the digital signal processor 828 receives signals corresponding to the rate of rotation of the sensor 800 from both the optical vibratory gyroscope 804 and the optical Sagnac gyroscope 806. The digital signal processor 828 then determines the errors in the signal output from the optical vibratory gyroscope based on the signals and corrects the rate of rotation obtained by the optical vibratory gyroscope 804 based on the two signals. The digital signal processor 828 may use cross correlation, averaging and/or weighting to determine the errors. The corrected rate of rotation is then output 830 by the inertial sensor 800. The determination of the correction is discussed above in relation to FIG. 1.

The microcontroller 108 of FIG. 1 or the microcontroller 208 of FIG. 2 may perform the role of the drive mode controller 816, sense mode controller 822, controller 836 and digital signal processing 828.

The light source 802 may also be connected to closed loop feedback. For example, where the light source 802 is a laser, a laser stabilisation control path (not shown) may be used to maintain the stability of the light source 802. Laser stabilisation techniques are known and so will not be discussed further.

Figure 9:
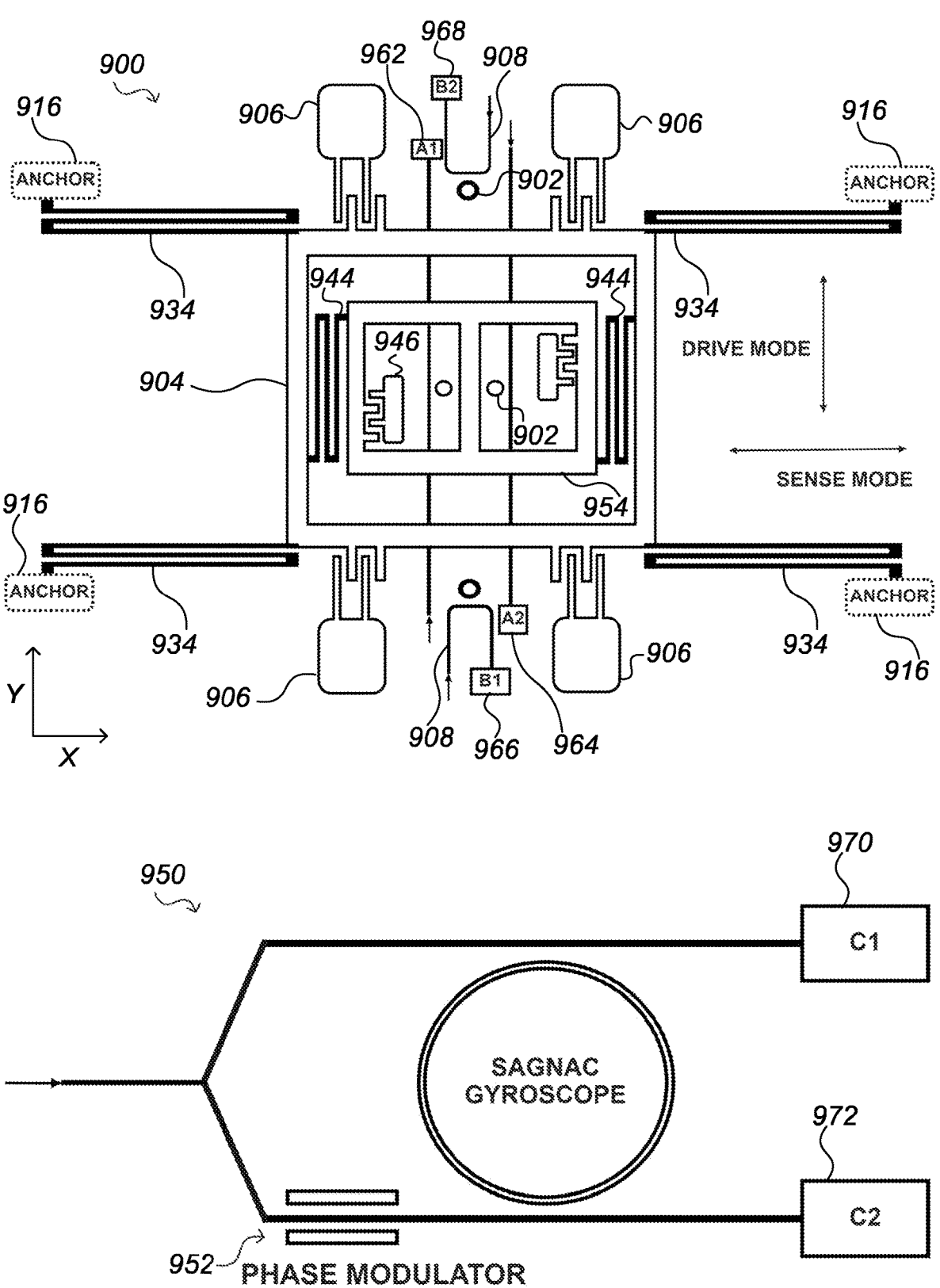
FIG. 9 shows a diagram of the gyroscopes of the inertial sensor according to an example.

FIG. 9 shows a diagram of an example optical vibratory gyroscope 900 and an example optical Sagnac gyroscope 950 of the inertial sensor. Optical vibratory gyroscope 900 is an example of optical vibratory gyroscope 104 of FIG. 1, optical vibratory gyroscope 204 of FIG. 2 and optical vibratory gyroscope 700 of FIG. 7. Optical Sagnac gyroscope 950 is an example of optical Sagnac gyroscope 106 of FIG. 1 and optical Sagnac gyroscope 206 of FIG. 2. In this example, both gyroscopes may be fabricated on the same substrate and/or using the same fabrication process.

The optical vibratory gyroscope 900 comprises an outer micro-electro-mechanical inertial test mass which acts like a frame 904 and an inner micro-electro-mechanical inertial test mass 954. The outer test mass frame 904 is suspended by means of four suspension means 934, which in this example are flexible parts of the outer test mass frame 904, connected to respective anchors 916. The anchors 916 are fixed relative to the optical vibratory gyroscope 900. These flexible parts of the outer test mass frame 904 may behave as springs. The suspension means 934 have high stiffness in the X direction but are bendable in the Y direction. Therefore, the outer test mass frame 904 is constrained to moving in the Y direction. The inner test mass 954 is suspended by means of two suspension means 944, which in this example are flexible parts of the inner test mass 954, connected from the outer sides of the inner test mass 954 to the inner sides of the outer test mass frame 904. These flexible parts of the inner test mass 954 may behave as springs. The suspension means 944 have high stiffness in the Y direction but are bendable in the X direction. Therefore, the inner test mass 954 is constrained from moving with respect to the outer test mass frame 904 in the Y direction and so moves with the outer test mass frame 904 in the Y direction. The inner test mass 954 can move with respect to the outer test mass frame 904 in the X direction. Thus, due to the stiffness of the suspension means 934 of the outer test mass frame 904 in the X direction, only the inner test mass, 954 experiences the X-axis Coriolis force created when under the application of rotation.

The optical vibratory gyroscope 900 also comprises four microresonators 902. The inner test mass 954 is suspended adjacent to and non-contiguous with two of the microresonators 902 and the outer test mass frame 904 is suspended adjacent to and non-contiguous with the other two microresonators 902. The optical vibratory gyroscope 900 further comprises four optical couplers 908 for coupling light into and out of a corresponding microresonator 902. Light enters the optical couplers as shown by the arrows illustrated in FIG. 9, is input into and output from the corresponding microresonator and is then output to the detector.

The optical vibratory gyroscope 900 further comprises four electrodes 906 for counteracting a deflection of the outer test mass frame 904 in the Y direction with an electrostatic force. There are two electrodes 906 above the outer test mass frame 904 and two below the outer test mass frame 904 so that the electrostatic force can be applied to opposite sides of the outer test mass frame 904 to precisely control the movement or maintenance of position of the outer test mass frame 904. The optical vibratory gyroscope 900 further comprises two electrodes 946 for counteracting a deflection of the inner test mass 954 in the X direction with an electrostatic force. Each of the six electrodes 906 comprise two fingers and are interdigitated.

The optical vibratory gyroscope 900 has a sensing mode and a driving mode that are performed simultaneously, as explained above in relation to FIG. 7. As shown in FIG. 9, the driving mode is along the Y axis and the sensing mode is along the X axis. The orientation of the suspension means 944, 934 constrains the direction of travel of the inner test mass 954 and outer test mass frame 904, as described above, so the drive mode doesn't cross couple to the sensing mode, and the Coriolis effect doesn't in turn, couple to the drive mode.

Regarding the driving mode, the four electrodes 906 at the top and bottom of the outer test mass frame 904 are for driving the frame 904 to vibrate at the frequency Q. The suspension means 944 connecting the outer test mass frame 904 and inner test mass 954 are stiff in the Y direction and therefore pass the vibration from the outer test mass frame 904 to the inner test mass 954. The vibrational energy is therefore translated from the outer test mass frame 904 to the inner test mass 954 such that the inner test mass experiences the Coriolis effect. The microresonators 902 either side of the protrusions at the top and bottom of the outer test mass frame 904 and their corresponding optical coupler 908 are for sensing that the test mass frame 904 is being driven at the correct frequency.

Regarding the sensing mode, the suspension means 944 at the left and right side of the inner test mass 954 enabling freedom of movement in the X direction. The inner test mass 954 is displaced in the X direction by rotation about the Z axis. When the test mass 954 is displaced along the X axis by Δx, the electrodes 946 inside the inner test mass 954 actuate the inner test mass 954 along the X axis to reduce drift and noise as explained in relation to FIG. 5.

When the outer test mass frame 904 is being driven at a frequency Ω in the Y direction, the vibrational energy is transferred to the inner test mass 954 which is constrained to move in the X axis due to the suspension geometry. When the gyroscope 900 is rotated, the inner test mass 954 deflects along the X axis at the frequency Ω due to the Coriolis effect. The rate of rotation can then be detected using the microresonators 902 to the left and right of the central column of the inner test mass in the same manner as explained in relation to FIG. 7.

Whilst FIG. 9 shows the electrostatic actuation being performed by interdigitated electrodes arranged in particular positions around the test mass, the electrostatic actuation can be arranged in any way which would produce a force on the test mass in the X and Y directions.

The arrangement shown in FIG. 9 provides the advantage of decreasing cross-axis coupling of the vibrations in the sense and drive direction because it uses two frames where the springs can be tuned to be very stiff in either the drive or sense direction.

Whilst FIG. 9 shows the optical vibratory gyroscope 900 having an inner test mass 954 and an outer test mass frame 904, the gyroscope can have a single test mass and can be designed in other ways such as a disk-type hemispherical system or a tuning fork structure.

For the optical vibratory gyroscope 900, due to the placement of the microresonators 902, the movement of the test mass 904 will change the spacing between the test mass 904 and the microresonators 902 in a differential way. By comparing the different changes in the light output from each optical coupler 908, a differential output can be determined. Such a differential output removes the errors that occur due to changes in the test-mass, for example, due to thermal expansion, as it focuses on the differential. The arrangement of the optical vibratory gyroscope 900 of FIG. 9 therefore allows for differential operation which significantly improves readout by reducing drift and temperature offsets.

A pair of detectors can perform a differential measurement on the detected signals to determine a differential output. Differential measurement is performed by comparing a signal received from a first detector of a pair of detectors to a signal received from a second detector of the pair of detectors. To obtain the differential outputs, the inertial sensor may comprise a first pair of detectors to receive the light from the output of the optical coupler 908 of the optical vibratory gyroscope 900 labelled A1 962 and the output of the optical coupler 908 of the optical vibratory gyroscope 900 labelled A2 964. The first pair of detectors can obtain a differential output for movement along the X direction. The inertial sensor may comprise a second pair of detectors to receive the light from the output of the optical coupler 908 of the optical vibratory gyroscope 900 labelled B1 966 and the output of the optical coupler 908 of the optical vibratory gyroscope 900 labelled B2 968. The second pair of detectors can obtain a differential output for movement along the Y direction.

The optical Sagnac gyroscope 950 comprises a Sagnac structure and two optical couplers to couple light into and out of the Sagnac structure. One of the optical couplers couples light into the Sagnac structure in the clockwise direction and the other optical coupler couples light into the Sagnac structure in the counter clockwise direction in order to detect the rate of rotation, as explained above in relation to FIG. 3. One of the optical couplers is connected to a phase modulator 952 to shift the phase of the light propagating through that optical coupler, and the Sagnac structure, by 90 degrees, as explained previously. The light coupled to the optical couplers from the Sagnac structure differs in optical path length due to rotation of the gyroscope. The inertial sensor may comprise a third pair of detectors to receive the light from the output of the optical coupler of the optical Sagnac gyroscope 950 labelled C1 970 and the output of the optical coupler 908 of the optical Sagnac gyroscope 950 labelled C2 972. This pair of detectors can perform a differential measurement on the detected signals to determine a differential output. For example, where the detectors are detecting a shift in resonance of the light propagating in each optical coupler, the differential measurement indicates the frequency difference between the resonances, eliminating any common error that could cause movement of both resonances in the same direction, for example due to changes in ambient temperature.

Figure 10:
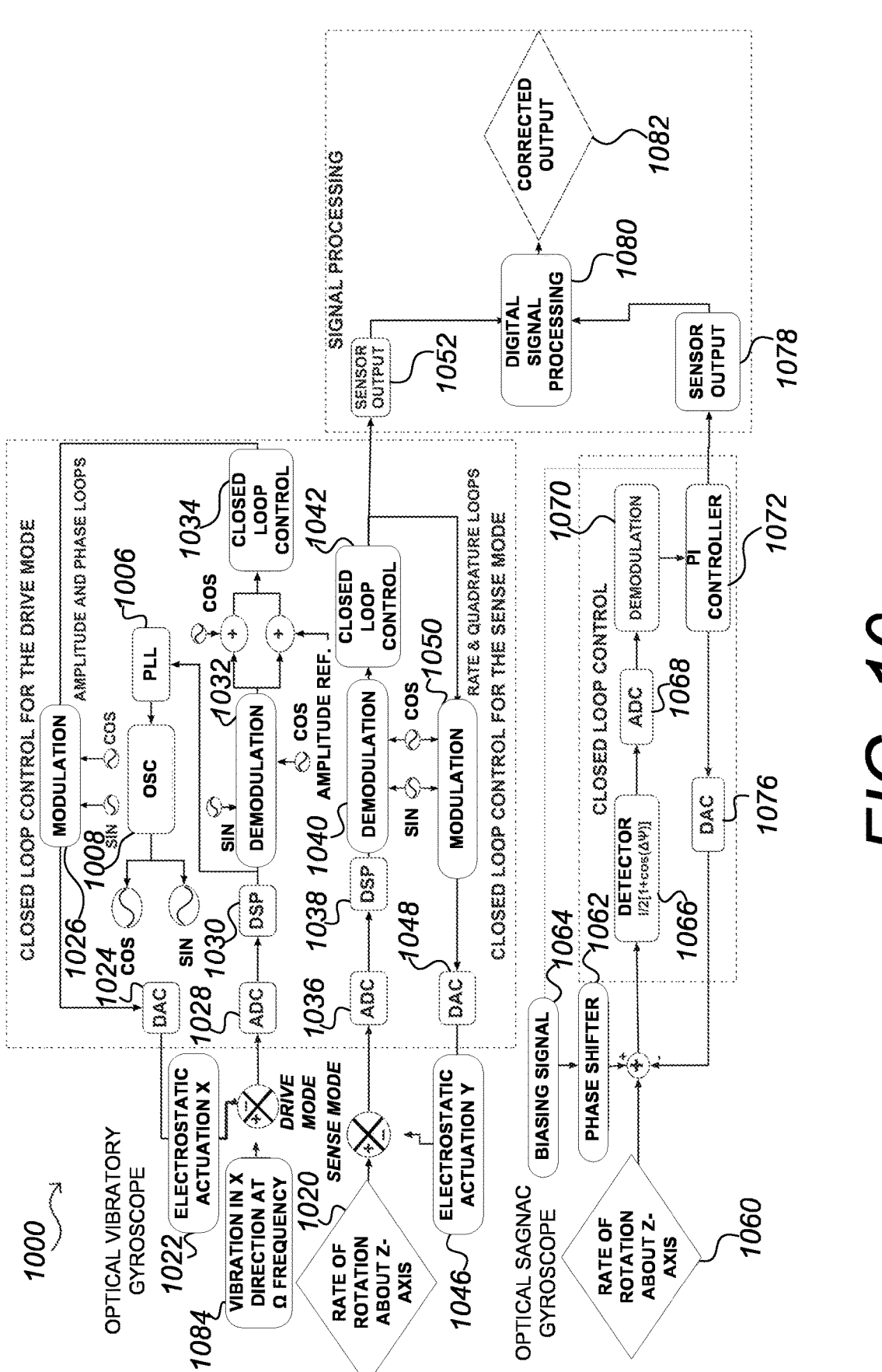
FIG. 10 illustrates an example closed loop feedback system.

FIG. 10 illustrates an example control loop feedback system for use with the inertial sensor. The control loop system comprises closed loop control for the sense and drive modes of the optical vibratory gyroscope of the inertial sensor and closed loop control for the optical Sagnac gyroscope of the inertial sensor. Whilst the closed loop control is explained below as being outside the gyroscopes, it may be implemented by a controller within the gyroscopes. Closed loop control may be implemented by the microcontroller of the sensor, for example microcontroller 108 of FIG. 1 or microcontroller 208 of FIG. 2.

The closed loop control for the sense and drive modes of the optical vibratory gyroscope is used to regulate the mechanical response. When the optical vibratory gyroscope is rotated about its Z axis 1020, the gyroscope is in both sensing mode and drive mode. The controller performing the closed loop feedback has separate closed loop controls for the drive mode and the sensing mode. The closed loop control for the drive mode is to keep the amplitude stable using closed loop feedback to adjust the electrostatic force 1022 by comparing and regulating the drive mode oscillation amplitude to a given reference setpoint. The closed loop control for the sensing mode is to monitor the gyroscope output and to look for changes in amplitude at the frequency $\Omega$ and to counteract such changes using electrostatic actuation 1046.

In the drive mode, the test mass is driven at the frequency $\Omega$ in the X direction 1084 using electrostatic actuation 1022. A driving force is exerted on the optical vibratory gyroscope in the X direction and the gyroscope outputs an output voltage V. The output voltage of the optical vibratory gyroscope is input into the controller for closed loop control for the drive mode. The output voltage is input into an analog to digital converter (ADC) 1028 within the controller to convert the voltage into a digital signal and is filtered using a digital signal processor (DSP) 1030. The signal is then demodulated 1032 to obtain a drive mode oscillation amplitude that can be compared to the given reference point. In particular, the demodulated signal is used to extract information about the offsets to the amplitude of vibration and frequency of vibration, which can then be corrected by feedback from the closed loop control. The closed loop control 1034 compares the drive mode oscillation amplitude to the given reference setpoint and determines the necessary actuation of the gyroscope to maintain stability. The closed loop control 1034 sends a drive signal via a modulator 1026 and a digital to analog converter (DAC) 1024 to the relevant electrodes of the optical vibratory gyroscope for electrostatic actuation 1022 in the X axis in order to maintain the correct vibration 1084. There is also a phase locked loop (PLL) 1006 connected to a digitally controlled oscillator 1008 that keeps the frequency locked and generates frequency references used in other parts of the system. To increase the sensitivity of the gyroscope to rate of rotation, it is important the driving force is very accurate and produces vibrations with a stable peak amplitude and frequency.

In the sensing mode, the rotation of the optical vibratory gyroscope about the Z axis 1020 causes a force to be exerted on the test mass along the Y axis. The gyroscope outputs an output voltage V. The output voltage of the gyroscope is input into the controller for closed loop control for the sensing mode. The output voltage is input into an ADC 1036 to convert the voltage into a digital signal and is filtered using a DSP 1038. The signal is then demodulated 1040 to obtain the in-phase rate that represent the Coriolis amplitude that is proportional to the rotation rate and occurs in response to a rate of rotation. The demodulator 1040 also outputs a quadrature signal that represents the error relating to frequency mismatch. The closed loop control 1042 then determines and outputs 1052 a signal corresponding to the rate of rotation using the in-phase rate to a digital signal processor 1080. The closed loop control 1042 also outputs a correction signal in order to suppress the quadrature signal and the in-phase rate. The correction signal is modulated 1050 and converted to a voltage signal through a DAC 1048 to the relevant electrodes of the optical vibratory gyroscope for electrostatic actuation in the Y axis 1046.

Closed loop control for the optical Sagnac gyroscope of the inertial sensor is used to tune the phase shifter to keep the input counterpropagating light fields at a 90 degree shift and keep the laser locked onto the resonances without drifting. The rotation of the optical Sagnac gyroscope about the Z axis 1060 causes a change in the optical path length of the light propagating clockwise and counter clockwise, which may be detected by detecting the phase difference between the resonances of the light propagating clockwise and counter clockwise or the change in output intensity from an interferometric readout of the light. The phase shifter 1062, using a biasing signal 1064, shifts the phase of the light propagating either clockwise or counter clockwise through the Sagnac structure by 90 degrees. The output of the optical Sagnac gyroscope is then detected by a detector 1066 to detect the frequency difference of the light propagating clockwise and counter clockwise or the change in interference of the light. The detector outputs an analog signal that corresponds to the rate of rotation and this signal is converted into a digital signal by an ADC 1068 and demodulated 1070 to obtain the signal corresponding to the interference pattern or difference in resonance and an error signal relating to frequency and/or phase. These are sent to a proportional integral (PI) controller 1072 which outputs 1078 a signal corresponding to the rate of rotation to a digital signal processor 1080. The PI controller 1072 also corrects for any drift of the input light by applying a feedback signal to the Sagnac gyroscope or input light source using DAC 1076 or by modifying the biasing signal 1064.

The digital signal processor 1080 receives the outputs from the optical vibratory gyroscope and optical Sagnac gyroscope. The digital signal processor 1080 compares these outputs to determine any errors in the output of the optical vibratory gyroscope. The digital signal processor 1080 then corrects the output of the optical vibratory gyroscope to reduce any errors and outputs the corrected output 1082 of the optical vibratory gyroscope from the inertial sensor.

Figure 11:
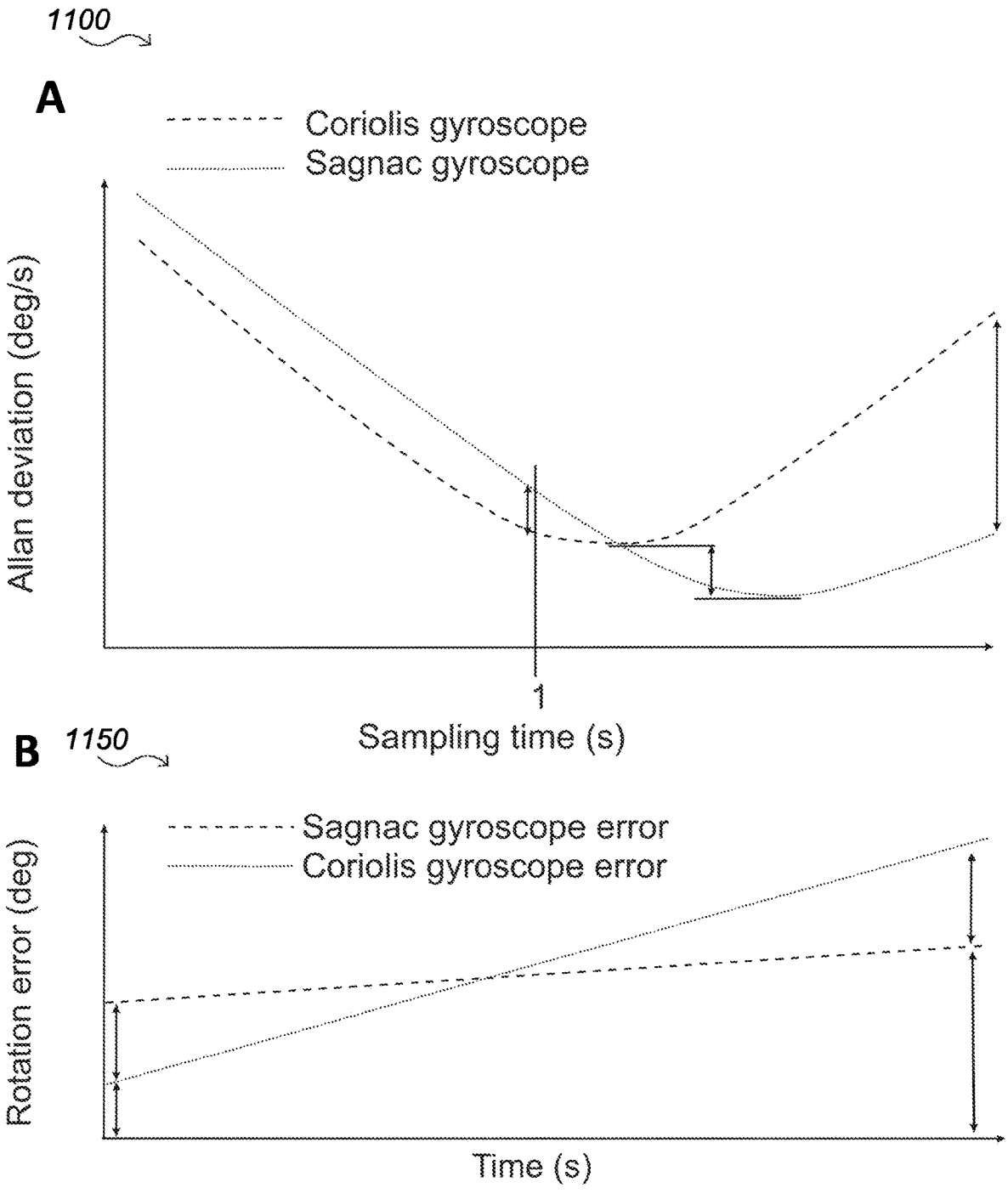
FIG. 11 shows examples of errors in the output of the optical vibratory gyroscope and optical Sagnac gyroscope.

FIG. 11 shows examples of errors in the output of the optical vibratory gyroscope and optical Sagnac gyroscope. Graph A 1100 shows the relationship between Allan deviation and sampling time. Allan deviation provides indications of the noise contributions and when they affect the sensor output e.g. in the short term or the long term. The dashed line shows the noise of the optical vibratory gyroscope and the dotted line shows the noise of the optical Sagnac gyroscope. As shown in Graph A 1100, as the sampling time increases, the optical vibratory gyroscope has a much larger error, caused by drift of the test mass. Conversely, the optical Sagnac gyroscope has lower long term drift. Thus, the optical Sagnac gyroscope provides the stable low drift signal that can correct for the optical vibratory gyroscope. Moreover, the difference between the Allan deviation of the two gyroscopes at a sampling time of 1 shows that the optical vibratory gyroscope has a lower noise density, meaning the optical vibratory gyroscope may have lower noise levels in the short term. These curves also show that the optical Sagnac gyroscope may have lower bias instability as the curve of the optical Sagnac gyroscope has a lower minimum.

Graph B 1150 shows the rotation error that is built up when the gyroscopes are stationary in time. The dashed line shows the rotation error of the optical Sagnac gyroscope and the dotted line shows the rotation error of the optical vibratory gyroscope. As shown in Graph B 1150, as time increases, the error of the optical vibratory gyroscope increases at a much higher rate than the error of the optical Sagnac gyroscope. Therefore, the use of the optical Sagnac gyroscope can benefit the long term stability by reducing the build up of rotation error of the optical vibratory gyroscope. Graph B 1150 also shows that the optical Sagnac gyroscope may start with a higher amount of noise (short term errors), however it has lower long term errors.

Thus, these graphs show that the error of the optical vibratory gyroscope over time can be much larger than the error of the optical Sagnac gyroscope and therefore correcting the output of the optical vibratory gyroscope using the output of the optical Sagnac gyroscope reduces the errors in the output signal of the sensor, providing a more accurate determination of rate of rotation.

Figure 12:
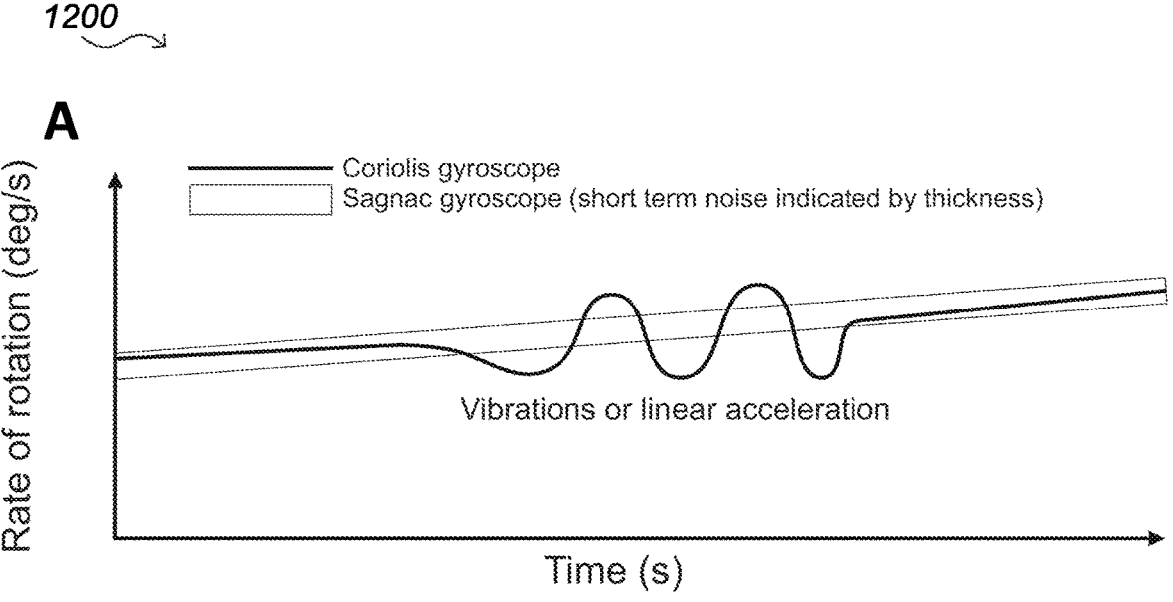
FIG. 12 shows example outputs of the optical vibratory gyroscope, optical Sagnac gyroscope and inertial sensor.
Figure 12:
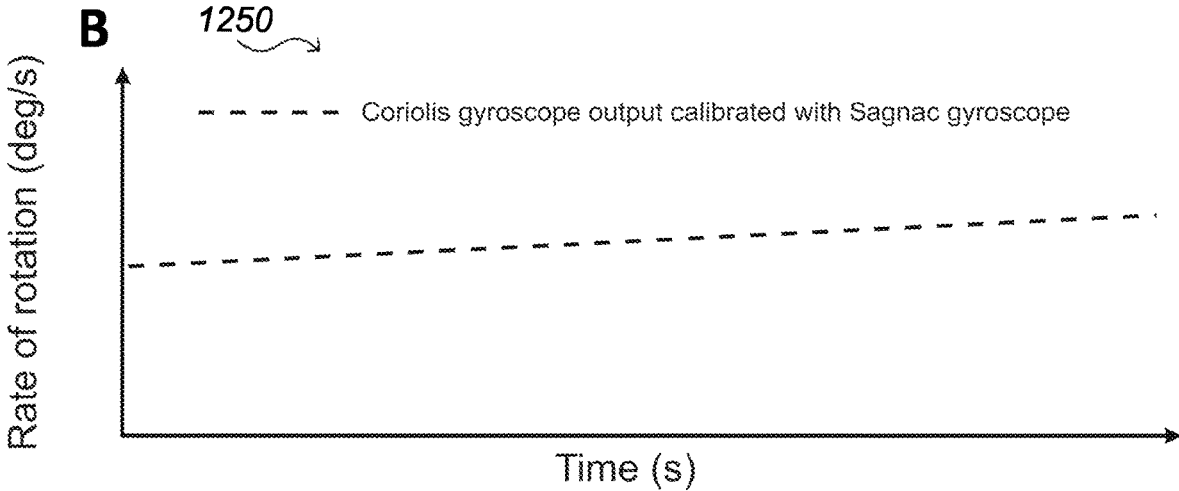

FIG. 12 shows example outputs of the optical vibratory gyroscope, optical Sagnac gyroscope and inertial sensor. Graph A 1200 shows the output of the optical vibratory gyroscope as a line and the output of the optical Sagnac gyroscope as a box, indicating that this output has more noise. The output of the optical vibratory gyroscope is not linear but contains minima and maxima where errors occur due to unwanted effects of vibration or linear acceleration on the optical vibratory gyroscope. Because the optical vibratory gyroscope relies on measurement of movement, any vibration or linear acceleration will create a false reading, as illustrated in this graph. As shown in the graph, the optical Sagnac gyroscope does not suffer from such unwanted effects and responds linearly to changing rates of rotation. Thus, as the optical Sagnac gyroscope does not provide false readings, it can be utilised to remove the false readings created by the optical vibratory gyroscope. Graph B shows the output of the inertial sensor, illustrating the successful removal of the errors at the output of the optical vibratory gyroscope by calibrating the output of the optical vibratory gyroscope with the output of the optical Sagnac gyroscope.

Figure 13:
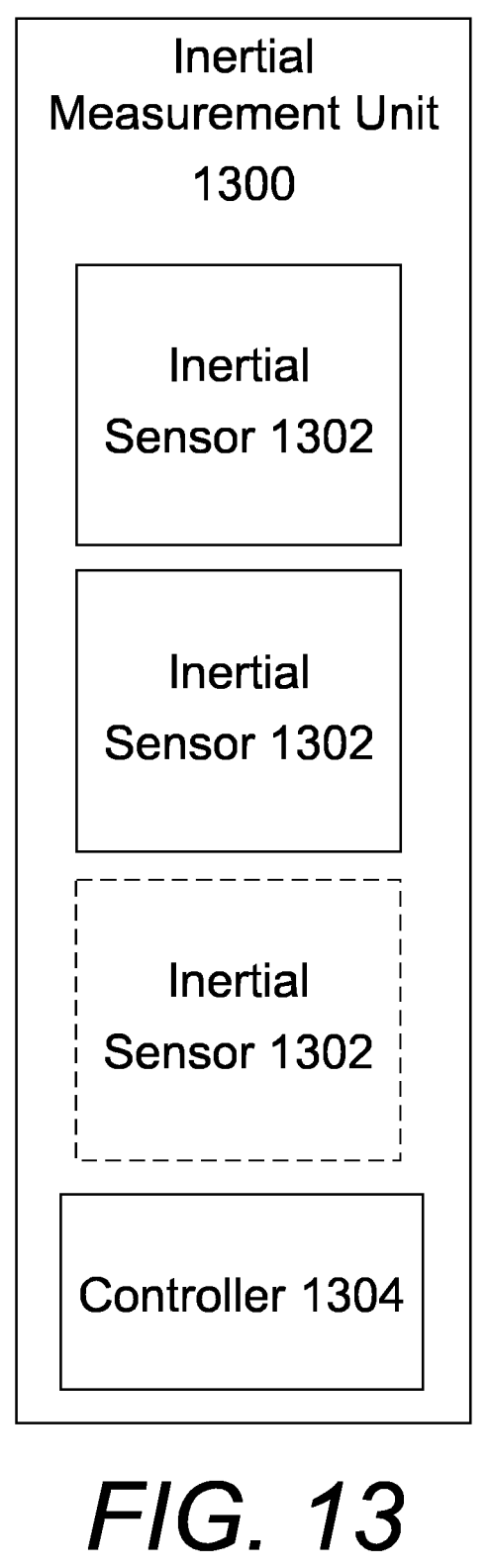

FIG. 13 shows a block diagram of an example inertial measurement unit (IMU) 1300. The IMU 1300 comprises a plurality of chip-scale inertial sensors 1302 and a controller 1304. FIG. 13 illustrates three inertial sensors 1302, with one of the inertial sensors 1302 in dashed lines, indicating it is optional. Whilst three sensors 1302 are shown in the IMU 1300, the IMU 1300 may comprise more or fewer inertial sensors.

Each inertial sensor 1302 comprises an optical vibratory gyroscope for detecting a first rate of rotation of the inertial sensor about the axis. The optical vibratory gyroscope is configured to output a main signal corresponding to the first rate of rotation. Each inertial sensor 1302 further comprises an optical Sagnac gyroscope for concurrently detecting a second rate of rotation of the inertial sensor about the axis. The optical Sagnac gyroscope is configured to output a supplementary signal corresponding to the second rate of rotation.

The inertial measurement unit 1300 further comprises a controller 1304 configured to, for each inertial sensor 1302, receive one or more inputs based on the main signal and supplementary signal of the inertial sensor 1302. The controller 1304 is further configured to, for each inertial sensor 1302, determine, based on the one or more inputs, a corrected first rate of rotation of the inertial sensor 1302 about the respective axis.

The controller 1304 may perform the operations of any microcontroller described herein. Each inertial sensor 1302 may be inertial sensor 100 of FIG. 1, inertial sensor 200 of FIG. 2 or inertial sensor 800 of FIG. 8. Each inertial sensor 1302 may comprise the elements of inertial sensor 100 of FIG. 1, inertial sensor 200 of FIG. 2 or inertial sensor 800 of FIG. 8 without the microcontroller, as the controller 1304 of the IMU 1300 may be shared amongst all sensors 1302.

The inertial measurement unit 1300 may comprise a first chip-scale inertial sensor 1302 for detecting rate of rotation of the first inertial sensor in a first axis, a second chip-scale inertial sensor 1302 for detecting rate of rotation of the second inertial sensor in a second axis perpendicular to the first axis and a third chip-scale inertial sensor 1302 for detecting rate of rotation of the third inertial sensor in a third axis perpendicular to the first axis and second axis. The controller 1304 may be further configured to determine a total rate of rotation of the inertial measurement unit 1300 based on the corrected first rate of rotation determined for each inertial sensor 1302.

For example, the three inertial sensors 1302 may comprise a sensor 1302 for detecting rate of rotation about the X axis, a sensor 1302 for detecting rate of rotation about the Y axis and a sensor 1302 for detecting rate of rotation about the Z axis. This enables the provision of 3 degrees of freedom for 3D orientation tracking.

Many variations of the methods described herein will be apparent to the skilled person.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A chip-scale inertial sensor for detecting a rate of rotation of the inertial sensor about an axis, the inertial sensor comprising:
    an optical vibratory gyroscope for detecting a first rate of rotation of the inertial sensor about the axis, the optical vibratory gyroscope configured to output a main signal corresponding to the first rate of rotation;
    an optical Sagnac gyroscope for concurrently detecting a second rate of rotation of the inertial sensor about the axis, the optical Sagnac gyroscope configured to output a supplementary signal corresponding to the second rate of rotation; and
    a microcontroller configured to:
        receive one or more inputs based on the main signal and supplementary signal; and
        determine, based on the one or more inputs, a corrected first rate of rotation of the inertial sensor about the axis.

2. A chip-scale inertial sensor according to claim 1, wherein the optical vibratory gyroscope and the optical Sagnac gyroscope receive light from the same light source.

3. A chip-scale inertial sensor according to claim 2, further comprising a beamsplitter to split the light from the light source for transmission into the optical vibratory gyroscope and the optical Sagnac gyroscope.

4. A chip-scale inertial sensor according to claim 3, further comprising a light source for transmitting light into the optical vibratory gyroscope and the optical Sagnac gyroscope.

5. A chip-scale inertial sensor according to claim 4, further comprising at least one detector to detect light transmitted from the optical vibratory gyroscope and the optical Sagnac gyroscope, the microcontroller to receive the one or more inputs from the at least one detector.

6. A chip-scale inertial sensor according to claim 5, wherein determining, based on the one or more inputs, a corrected first rate of rotation comprises comparing the first rate of rotation to the second rate of rotation and determining the corrected first rate of rotation based on the comparison.

7. A chip-scale inertial sensor according to claim 6,
    wherein comparing the first rate of rotation to the second rate of rotation comprises calculating the difference between the main signal and supplementary signal to determine the short and long term errors of the optical vibratory gyroscope and,
    wherein determining the corrected first rate of rotation based on the comparison comprises correcting the main signal to remove the short and long term errors.

8. A chip-scale inertial sensor according to claim 7, wherein the errors are due to linear acceleration and/or long term drift of the inertial sensor.

9. A chip-scale inertial sensor according to claim 8,
    wherein comparing the first rate of rotation to the second rate of rotation comprises determining if the main signal is saturated, and
    wherein, if the main signal is saturated, the corrected first rate of rotation is determined using the supplementary signal only.

10. A chip-scale inertial sensor according to claim 9, wherein the optical vibratory gyroscope and optical Sagnac gyroscope are fabricated on the same chip.

11. A chip-scale inertial sensor according to claim 10, wherein the microcontroller is further configured to output a feedback signal to actuate a test mass of the optical vibratory gyroscope to recalibrate the optical vibratory gyroscope based on the comparison.

12. A chip-scale inertial sensor according to claim 11, wherein the feedback signal is output to electrodes of the optical vibratory gyroscope to electrostatically actuate the test mass.

13. A chip-scale inertial sensor according to claim 12, wherein the optical Sagnac gyroscope comprises a coiled or spiralled waveguide structure to propagate light clockwise and counter clockwise, the rotation of the sensor causing changes in the optical path lengths of the light propagating clockwise and counter clockwise.

14. A chip-scale inertial sensor according to claim 13, wherein the coiled or spiralled waveguide structure is in the form of one of a coiled optical fiber, a coiled waveguide, a spiralled waveguide and a microdisk.

15. A chip-scale inertial sensor according to claim 14, wherein the diameter of the coiled or spiralled waveguide structure is in the order of millimetres or centimetres.

16. A chip-scale inertial sensor according to claim 15, wherein the microcontroller is to control the frequency of the light propagating clockwise and counter clockwise based on the supplementary signal output by the optical Sagnac gyroscope to reduce frequency changes of the light due to drifting.

17. A chip-scale inertial sensor according to claim 16, wherein the optical Sagnac gyroscope and optical vibratory gyroscope are made of silicon or silicon nitride.

18. A chip-scale inertial sensor according to claim 17, wherein the optical vibratory gyroscope comprises:

one or more microresonators, each microresonator supporting a corresponding optical resonance;

a micro-electro-mechanical inertial test mass suspended adjacent to and non-contiguous with the one or more microresonators, the test mass deflectable under the application of an inertial force;

one or more optical couplers for coupling light transmitted into the optical vibratory gyroscope into and out of a corresponding microresonator; and one or more detectors for detecting light received from the one or more microresonators by the one or more optical couplers, wherein a change in a spacing between the test mass and at least one microresonator causes a change in the optical resonance characteristics of that microresonator.

19. A chip-scale inertial sensor according to claim 18, wherein the optical vibratory gyroscope further comprises one or more electrodes for counteracting a deflection of the test mass with an electrostatic force; and wherein the microcontroller is further configured to:

control the electrostatic force of the one or more electrodes to cause the test mass to vibrate at a fixed frequency in a first direction perpendicular to the axis such that the optical vibratory gyroscope can detect the first rate of rotation of the inertial sensor about the axis;

receive an electrical signal from the one or more detectors;

detect a change in the optical resonance characteristics of the one or more microresonators in response to a change in the spacing between the test mass and the one or more microresonators in a second direction perpendicular to the first direction at the fixed frequency; and determine the first rate of rotation of the inertial sensor about the axis based on the change in optical resonance characteristics of the one or more microresonators.

20. A chip-scale inertial sensor according to claim 19, wherein the microcontroller is further configured to control the electrostatic force of the one or more electrodes to recalibrate the optical vibratory gyroscope based on the comparison.

21. An inertial measurement unit comprising:

a plurality of chip-scale inertial sensors for detecting a rate of rotation about a respective axis, each inertial sensor comprising:

an optical vibratory gyroscope for detecting a first rate of rotation of the inertial sensor about the axis, the optical vibratory gyroscope configured to output a main signal corresponding to the first rate of rotation; and an optical Sagnac gyroscope for concurrently detecting a second rate of rotation of the inertial sensor about the axis, the optical Sagnac gyroscope configured to output a supplementary signal corresponding to the second rate of rotation; and a controller configured to, for each inertial sensor:

receive one or more inputs based on the main signal and supplementary signal of the inertial sensor; and determine, based on the one or more inputs, a corrected first rate of rotation of the inertial sensor about the respective axis.

22. An inertial measurement unit according to claim 21, the inertial measurement unit comprising a first chip-scale inertial sensor for detecting rate of rotation of the first inertial sensor in a first axis, a second chip-scale inertial sensor for detecting rate of rotation of the second inertial sensor in a second axis perpendicular to the first axis and a third chip-scale inertial sensor for detecting rate of rotation of the third inertial sensor in a third axis perpendicular to the first axis and second axis, wherein the controller is further configured to determine a total rate of rotation of the inertial measurement unit based on the corrected first rate of rotation determined for each inertial sensor.

23. A chip comprising a chip-scale inertial sensor according to claim 22.

24. A method performed by a microcontroller for determining a rate of rotation of an inertial sensor about an axis, the method comprising:

receiving one or more inputs based on a main signal output from an optical vibratory gyroscope for detecting a first rate of rotation of the inertial sensor about the axis and a supplementary signal output from an optical Sagnac gyroscope for concurrently detecting a second rate of rotation of the inertial sensor about the axis; and determining, based on the one or more inputs, a corrected first rate of rotation of the inertial sensor about the axis.

25. A computer readable medium having instructions stored thereon which, when executed by one or more processors, cause the one or more processors to perform the method of claim 24.

* * * * *